United States Patent
Myrick

(10) Patent No.: US 12,121,964 B2
(45) Date of Patent: Oct. 22, 2024

(54) PROCESSES, COMPOSITIONS AND SYSTEMS FOR 2D AND 3D PRINTING

(71) Applicant: James J. Myrick, Saint Augustine, FL (US)

(72) Inventor: James J. Myrick, Saint Augustine, FL (US)

(*) Notice: Subject to any disclaimer, the term of this patent is extended or adjusted under 35 U.S.C. 154(b) by 0 days.

(21) Appl. No.: 18/312,371

(22) Filed: May 4, 2023

(65) Prior Publication Data

US 2023/0271248 A1   Aug. 31, 2023

Related U.S. Application Data

(63) Continuation of application No. 16/677,424, filed on Nov. 7, 2019, now abandoned.

(60) Provisional application No. 62/756,805, filed on Nov. 7, 2018.

(51) Int. Cl.

| | |
|---|---|
| *B22F 1/054* | (2022.01) |
| *B22F 10/00* | (2021.01) |
| *B23K 26/342* | (2014.01) |
| *B29C 64/165* | (2017.01) |
| *B33Y 10/00* | (2015.01) |
| *B33Y 70/00* | (2020.01) |
| *C09D 11/03* | (2014.01) |
| *C09D 11/106* | (2014.01) |
| *C09D 11/52* | (2014.01) |
| *B29K 105/16* | (2006.01) |
| *B29K 505/14* | (2006.01) |
| *C08K 3/08* | (2006.01) |
| *C08K 3/20* | (2006.01) |

(52) U.S. Cl.
CPC ............ *B22F 1/054* (2022.01); *B22F 10/00* (2021.01); *B23K 26/342* (2015.10); *B29C 64/165* (2017.08); *B33Y 10/00* (2014.12); *B33Y 70/00* (2014.12); *C09D 11/03* (2013.01); *C09D 11/106* (2013.01); *C09D 11/52* (2013.01); *B22F 2301/255* (2013.01); *B29K 2105/162* (2013.01); *B29K 2505/14* (2013.01); *C08K 2003/085* (2013.01); *C08K 3/20* (2013.01); *C08K 2201/001* (2013.01)

(58) Field of Classification Search
CPC ...................................................... B22F 1/054
See application file for complete search history.

(56) References Cited

U.S. PATENT DOCUMENTS

| | | |
|---|---|---|
| 3,006,248 A | 10/1961 | Linke et al. |
| 3,455,223 A | 7/1969 | Spoelhof |
| 5,004,328 A | 4/1991 | Suzuki et al. |
| 5,012,081 A | 4/1991 | Jungwirth et al. |

(Continued)

OTHER PUBLICATIONS

Kamran, M. and Saxena, A., "A Comprehensive Study on 3D Printing Technology." (2016). pp. 63-69. vol. 6, No. 2, MIT International Journal of Mechanical Engineering.

(Continued)

*Primary Examiner* — William D Young
(74) *Attorney, Agent, or Firm* — Husch Blackwell LLP

(57) ABSTRACT

The present disclosure is directed to 3D printing and other additive manufacturing, in aspects including aqueous dispersion precipitation, exothermic metal conductor processing, foaming, seeding, thermosensitive polymers, build material crosslinking.

10 Claims, 7 Drawing Sheets
(7 of 7 Drawing Sheet(s) Filed in Color)

(56) References Cited

U.S. PATENT DOCUMENTS

| | | |
|---|---|---|
| 5,067,803 A | 11/1991 | Ohno |
| 5,311,611 A | 5/1994 | Migliaccio |
| 5,514,885 A | 5/1996 | Myrick |
| 5,592,286 A | 1/1997 | Fedor |
| 5,627,684 A | 5/1997 | Lewis |
| 5,629,532 A | 5/1997 | Myrick |
| 5,666,234 A | 9/1997 | Ohno |
| 5,689,376 A | 11/1997 | Lewis |
| 5,739,965 A | 4/1998 | Ohno |
| 6,097,545 A | 8/2000 | Vaughan |
| 6,122,009 A | 9/2000 | Ueda |
| 6,181,455 B1 | 1/2001 | Ishihara |
| 6,335,835 B1 | 1/2002 | Koike |
| 6,391,251 B1 | 5/2002 | Keicher et al. |
| 6,985,184 B2 | 1/2006 | Sato |
| 7,025,945 B2 | 4/2006 | Nishi et al. |
| 7,110,189 B2 | 9/2006 | Koike |
| 7,383,621 B2 | 6/2008 | Sube |
| 7,786,421 B2 | 8/2010 | Nikzad et al. |
| 7,907,774 B2 | 3/2011 | Parr et al. |
| 8,182,713 B2 | 5/2012 | Xiaobing et al. |
| 8,488,257 B2 | 7/2013 | Stark |
| 8,878,116 B2 | 11/2014 | Itonaga |
| 8,939,107 B2 | 1/2015 | Yang et al. |
| 9,053,562 B1 | 6/2015 | Rabin et al. |
| 9,104,018 B2 | 8/2015 | Ishihara |
| 9,184,368 B2 | 11/2015 | Shibayama et al. |
| 9,219,224 B2 | 12/2015 | Ebigase et al. |
| 9,453,986 B2 | 9/2016 | Ishihara |
| 9,490,285 B2 | 11/2016 | Itonaga |
| 9,596,455 B2 | 3/2017 | Zawa et al. |
| 9,680,085 B2 | 6/2017 | Furuta et al. |
| 9,765,271 B2 | 9/2017 | Myrick |
| 9,812,473 B2 | 11/2017 | Miyamoto et al. |
| 9,912,915 B2 | 3/2018 | Sinclair |
| 9,955,872 B2 | 5/2018 | Dillon et al. |
| 9,964,398 B2 | 5/2018 | Becker et al. |
| 10,008,024 B2 | 6/2018 | Forutanpour et al. |
| 10,015,478 B1 | 7/2018 | Rabin et al. |
| 10,035,307 B2 | 7/2018 | Chen et al. |
| 10,068,385 B2 | 9/2018 | Bleiweiss et al. |
| 2004/0075196 A1 | 4/2004 | Lockard et al. |
| 2004/0081573 A1 | 4/2004 | Newell |
| 2004/0137368 A1 | 7/2004 | Steinmann |
| 2004/0166187 A1 | 8/2004 | Fong |
| 2004/0170923 A1 | 9/2004 | Steinmann et al. |
| 2004/0182202 A1 | 9/2004 | Geving et al. |
| 2004/0183226 A1 | 9/2004 | Newell et al. |
| 2004/0184944 A1 | 9/2004 | Geving et al. |
| 2004/0200816 A1 | 10/2004 | Chung et al. |
| 2004/0226405 A1 | 11/2004 | Geving et al. |
| 2004/0229002 A1 | 11/2004 | Davis et al. |
| 2004/0242728 A1 | 12/2004 | Xu et al. |
| 2005/0017393 A1 | 1/2005 | Stockwell et al. |
| 2005/0040562 A1 | 2/2005 | Steinmann et al. |
| 2005/0110200 A1 | 5/2005 | Fong |
| 2005/0242473 A1 | 11/2005 | Newell et al. |
| 2005/0253308 A1 | 11/2005 | Sherwood |
| 2005/0263933 A1 | 12/2005 | Welch et al. |
| 2005/0263934 A1 | 12/2005 | Chung et al. |
| 2006/0007369 A1 | 1/2006 | Jin et al. |
| 2006/0046010 A1 | 3/2006 | Davis et al. |
| 2006/0078638 A1 | 4/2006 | Holmboe et al. |
| 2006/0118532 A1 | 6/2006 | Chung et al. |
| 2006/0119012 A1 | 6/2006 | Ruatta et al. |
| 2006/0192312 A1 | 8/2006 | Wahlstrom |
| 2006/0214335 A1 | 9/2006 | Cox |
| 2006/0215246 A1 | 9/2006 | Kerekes et al. |
| 2006/0219315 A1 | 10/2006 | Cox |
| 2006/0219671 A1 | 10/2006 | Merot et al. |
| 2006/0239588 A1 | 10/2006 | Hull et al. |
| 2006/0249485 A1 | 11/2006 | Partanen et al. |
| 2006/0249884 A1 | 11/2006 | Partanen et al. |
| 2007/0057412 A1 | 3/2007 | Weiskopf et al. |
| 2007/0063366 A1 | 3/2007 | Cunningham et al. |
| 2007/0074659 A1 | 4/2007 | Wahlstrom |
| 2007/0075458 A1 | 4/2007 | Wahlstrom et al. |
| 2007/0075459 A1 | 4/2007 | Reynolds et al. |
| 2007/0075460 A1 | 4/2007 | Wahlstrom et al. |
| 2007/0075461 A1 | 4/2007 | Hunter et al. |
| 2007/0077323 A1 | 4/2007 | Stonesmith et al. |
| 2007/0090568 A1 | 4/2007 | Teal et al. |
| 2007/0257055 A1 | 11/2007 | Scott et al. |
| 2007/0259066 A1 | 11/2007 | Sperry et al. |
| 2008/0041487 A1 | 2/2008 | Cox |
| 2008/0054531 A1 | 3/2008 | Kerekes et al. |
| 2008/0226346 A1 | 9/2008 | Hull et al. |
| 2008/0309665 A1 | 12/2008 | Gregory, II et al. |
| 2009/0072447 A1 | 3/2009 | Hull et al. |
| 2009/0110763 A1 | 4/2009 | Sperry et al. |
| 2009/0169664 A1 | 7/2009 | Cox |
| 2009/0239175 A1 | 9/2009 | Steinmann |
| 2010/0038268 A1 | 2/2010 | Reynolds et al. |
| 2010/0098835 A1 | 4/2010 | Wang et al. |
| 2010/0155985 A1 | 6/2010 | Mcalea et al. |
| 2010/0156003 A1 | 6/2010 | Wahlstrom |
| 2010/0184910 A1 | 7/2010 | Howe et al. |
| 2010/0190881 A1 | 7/2010 | Steinmann |
| 2010/0288194 A1 | 11/2010 | Stockwell et al. |
| 2011/0207057 A1 | 8/2011 | Hull et al. |
| 2011/0211106 A1 | 9/2011 | Marks et al. |
| 2011/0272857 A1 | 11/2011 | Sperry et al. |
| 2011/0285061 A1 | 11/2011 | Mcalea et al. |
| 2011/0304074 A1 | 12/2011 | Wang et al. |
| 2012/0007288 A1 | 1/2012 | Wang et al. |
| 2012/0010741 A1 | 1/2012 | Hull et al. |
| 2012/0099173 A1 | 4/2012 | Gentry et al. |
| 2012/0133080 A1 | 5/2012 | Moussa et al. |
| 2012/0213976 A1 | 8/2012 | Xu et al. |
| 2012/0217606 A1 | 8/2012 | Itonaga |
| 2012/0231232 A1 | 9/2012 | Xu et al. |
| 2013/0003196 A1 | 1/2013 | Guenter et al. |
| 2013/0063634 A1 | 3/2013 | Yamano |
| 2013/0075954 A1 | 3/2013 | Gregory, II et al. |
| 2013/0076900 A1 | 3/2013 | Mrozek et al. |
| 2013/0078325 A1 | 3/2013 | Sperry et al. |
| 2013/0096708 A1 | 4/2013 | Danks |
| 2013/0100092 A1 | 4/2013 | Danks |
| 2013/0150762 A1 | 6/2013 | Summit et al. |
| 2013/0150981 A1 | 6/2013 | Summit |
| 2013/0154160 A1 | 6/2013 | Cooper |
| 2013/0164402 A1 | 6/2013 | Hickerson et al. |
| 2013/0226533 A1 | 8/2013 | Summit et al. |
| 2013/0236706 A1 | 9/2013 | Xu et al. |
| 2013/0247946 A1 | 9/2013 | Summit et al. |
| 2013/0278714 A1 | 10/2013 | Hirose |
| 2013/0307193 A1 | 11/2013 | Johnson et al. |
| 2013/0310507 A1 | 11/2013 | Tummala et al. |
| 2014/0017460 A1 | 1/2014 | Xu et al. |
| 2014/0027950 A1 | 1/2014 | Stockwell et al. |
| 2014/0049683 A1 | 2/2014 | Guenter et al. |
| 2014/0065378 A1 | 3/2014 | Xu |
| 2014/0072712 A1 | 3/2014 | Xu |
| 2014/0076499 A1 | 3/2014 | Stockwell et al. |
| 2014/0081190 A1 | 3/2014 | Summit et al. |
| 2014/0084517 A1 | 3/2014 | Sperry et al. |
| 2014/0100825 A1 | 4/2014 | Summit |
| 2014/0142486 A1 | 5/2014 | Summit et al. |
| 2014/0154378 A1 | 6/2014 | Von Hasseln et al. |
| 2014/0209786 A1 | 7/2014 | Sano |
| 2014/0228725 A1 | 8/2014 | Summit et al. |
| 2014/0253677 A1 | 9/2014 | Chen et al. |
| 2014/0265045 A1 | 9/2014 | Cullen et al. |
| 2014/0267268 A1 | 9/2014 | Tipton |
| 2014/0271326 A1 | 9/2014 | Cullen et al. |
| 2014/0275317 A1 | 9/2014 | Moussa |
| 2014/0300976 A1 | 10/2014 | Pornin |
| 2014/0333625 A1 | 11/2014 | Itkowitz et al. |
| 2014/0345521 A1 | 11/2014 | Silverbrook |
| 2015/0352785 A1 | 12/2015 | Folgar et al. |
| 2016/0050379 A1 | 2/2016 | Jiang et al. |
| 2016/0172393 A1 | 6/2016 | Kim |
| 2016/0202451 A1 | 7/2016 | Guenter et al. |
| 2016/0266388 A1 | 9/2016 | Dobschal et al. |

(56) References Cited

U.S. PATENT DOCUMENTS

| | | |
|---|---|---|
| 2016/0279874 A1 | 9/2016 | Martinoni et al. |
| 2016/0286102 A1 | 9/2016 | Sulfridge et al. |
| 2016/0325506 A1 | 11/2016 | Puigardeu Aramendia et al. |
| 2016/0339636 A1 | 11/2016 | De Pena et al. |
| 2016/0366728 A1 | 12/2016 | Folgar et al. |
| 2016/0368225 A1 | 12/2016 | Jones |
| 2016/0370792 A1 | 12/2016 | Jacobs et al. |
| 2017/0197366 A1 | 7/2017 | Abbott, Jr. |
| 2017/0203513 A1 | 7/2017 | Chanclon et al. |
| 2017/0246801 A1 | 8/2017 | Stodder et al. |
| 2017/0368756 A1 | 12/2017 | Sanz Ananos et al. |
| 2018/0032059 A1 | 2/2018 | Morovic et al. |
| 2018/0036947 A1 | 2/2018 | Chanclon et al. |
| 2018/0036949 A1 | 2/2018 | Lopez et al. |
| 2018/0036950 A1 | 2/2018 | Vilajosana et al. |
| 2018/0040131 A1 | 2/2018 | Zeng et al. |
| 2018/0050492 A1 | 2/2018 | Sanz Ananos et al. |
| 2018/0050493 A1 | 2/2018 | Sanz Ananos et al. |
| 2018/0052447 A1 | 2/2018 | Morovic et al. |
| 2018/0052947 A1 | 2/2018 | Garcia-Reyero Vinas et al. |
| 2018/0071988 A1 | 3/2018 | Emamjomeh et al. |
| 2018/0126631 A1 | 5/2018 | Nauka et al. |
| 2018/0133957 A1 | 5/2018 | Ramirez Muela et al. |
| 2018/0133969 A1 | 5/2018 | Huang et al. |
| 2018/0133972 A1 | 5/2018 | Morovic et al. |
| 2018/0133975 A1 | 5/2018 | Zhao et al. |
| 2018/0134028 A1 | 5/2018 | Morovic et al. |
| 2018/0155248 A1 | 6/2018 | Mccandlish et al. |
| 2018/0207876 A1 | 7/2018 | Querol Esparch et al. |
| 2018/0243990 A1 | 8/2018 | Abbott, Jr. et al. |
| 2018/0264753 A1 | 9/2018 | Kornilovich et al. |
| 2018/0272560 A1 | 9/2018 | Abbott, Jr. et al. |
| 2018/0272561 A1 | 9/2018 | Kasperchik et al. |
| 2018/0272600 A1 | 9/2018 | Shaarawi et al. |
| 2018/0272601 A1* | 9/2018 | Erickson ............... B29C 64/227 |
| 2018/0272607 A1 | 9/2018 | Chaffins et al. |
| 2018/0273720 A1 | 9/2018 | Huang et al. |

OTHER PUBLICATIONS

Meregg, J.R. and Tang, T.Y.D., "Polynucleotides in Cellular Mimics: Coacervates and Lipid Vesicles." (2016). pp. 50-57. Current Opinion in Colloid & Interface Science 26.

Mathew, S. and Varghese, S., "Effect of Compounding Characteristics on Heat Sensitization of PVME Blended Natural Rubber Latex Compound." (2015). pp. 232-239. vol. 4, Issue 8, International Journal of Innovative Research & Development.

Van Der Kooij, H.M., et al., "On the Stability and Morphology of Complex Coacervate Core Micelles: From Spherical to Wormlike Micelles." (2012). pp. 14180-14191. vol. 28, No. 40, Langmuir.

Kujawa, P., et al., "Amphiphilic Telechelic Poly(N-isopropylacrylamide) in Water: From Micelles to Gels." (2005). pp. 129-137. vol. 17, No. 2, Eur. Phys. J. E.

Aseyev, V., et al., "Non-ionic Thermoresponsive Polymers in Water." (2011). pp. 29-89. vol. 242, Adv Polym Sci.

Ward, M., et al., "Multicompartment Thermoresponsive Gels: Does the Length of the Hydrophobic Side Group Matter?" (2013). vol. 4, No. 6, Polymer Chemistry.

Urban, M.W., et al., "Key-and-lock Commodity Self-healing Copolymers." (2018). pp. 220-225. vol. 362, Issue 6411, Science.

Judai, K., et al., "Increased Electric Conductance Through Physisorbed Oxygen on Copper Nanocables Sheathed in Carbon." (2008). pp. 1142-1143. vol. 130, No. 4, Journal of the American Chemical Society.

Nishijo, J., et al., "Facile and Mass-Producible Fabrication of One Dimensional Ag Nanoparticle Arrays." (2007). pp. 4627-4629. vol. 19, No. 19, Chemistry of Materials.

Wang, W., et al., "Facile Synthesis and Catalytic Properties of Silver Colloidal Nanoparticles Stabilized by SDBS." (2014). pp. 797-803. vol. 37, No. 4, Bull. Mater. Sci.

Ouyang, J., "Enhanced Piezoelectric Performance of Printed PZT Films on Low Temperature Substrates." (2017). Thesis. Rochester Institute of Technology, ritscholarworks@rit.edu.

Murray, S.J., et al., "6% Magnetic-Field-Induced Strain by Twin-boundary Motion in Ferromagnetic Ni—Mn—Ga." (2000). pp. 886-888. vol. 77, No. 6, Appl. Phys. Lett.

Straka, L., et al., "Ni—Mn—Ga Single Crystals with Very Low Twinning Stress." (2011). J. Phys. Conf. Ser. 303:012079. DOI:10.1088/1742-6596/303/1/012079.

Mengareev, I., et al., "Femtosecond Laser Post-Processing of Metal Parts Produced by Laser Additive Manufacturing." (2013). J. Laser Appl. 25, May 2009.

Takashi, I., et al., "Bar and Wire Steels for Gears and Valves of Automobiles—Eco-friendly Free Cutting Steel without Lead Addition." (2004). pp.64-69. No. 4, JFE Technical Report, Originally published in JFR GIHO No. 4.

Skylar-Scott, M.A., et al., "Laser-assisted Direct Ink Writing of Planar and 3D Metal Architectures." (2016). pp. 6137-6142. vol. 113, No. 22, PNAS.

Achilleos, D.S., et al., "End-Grafted Polymer Chains onto Inorganic Nano-Objects." (2010). pp. 1981-2026. vol. 3, Materials, DOI:10.3390/ma3031981.

Zhang, T., et al., "Bulk Glassy Alloys in (Fe, Co, Ni)—Si—B System." (2001). pp. 1015-1018. vol. 42, Materials Transactions.

Chen, M.W., et al., "Microstructure Investigation of an Annealed Amorphous Fe—C—Si—B Cast Iron." (2000). pp. 1021-1026. vol. 43, Scripta Mater.

Deng, C., et al., "Preparation and Characterization of Carbon Nanotubes/Aluminum Matrix Composites." (2007). pp. 1725-1728. vol. 61, Materials Letters.

Riebold, M., et al., "Carbon Nanotubes in an Ancient Damascus Sabre." (2006). pp. 286. vol. 444, Nature.

Yao, Y., et al., "'Cloning' of Single-Walled Carbon Nanotubes via Open-End Growth Mechanism." (2009). pp. 1673-1677. vol. 9, No. 4, Nano Letters.

Jozwik, P., et al., "Applications of Ni3Al Based Intermetallic Alloys—Current Stage and Potential Perceptivities." (2015). pp. 2537-2568. vol. 8, Materials.

Phokaratkul, D., et al., "Novel 3D Graphene Foam-Polyaniline-Carbon Nanotubes Supercapacitor Prepared by Electropolymerization." (2015). IEEE 15th International Conference on Nanotechnology, NJ, USA.

Ramesh, G.V., et al., "Real Time Monitoring of the In Situ Growth of Silver Nanoparticles in a Polymer Film Under Ambient Conditions." (2009). pp. 10059-10063. vol. 11, Physical Chemistry Chemical Physics.

Grucela-Zajac, M., et al., "(Photo)physical Properties of New Molecular Glasses End-Capped with Thiophene Rings Composed of Diimide and Imine Units." (2014). pp. 13070-13086. vol. 118, Journal of Physical Chemistry.

Guenter, B., et al., "Highly Curved Image Sensors: A Practical Approach for Improved Optical Performance." (2017). pp. 13010-13023. vol. 25, Optics Express.

Dumas, D., et al., "Curved Focal Plane Detector Array for Wide Field Cameras." (2012). pp. 5419-5424. vol. 51, No. 22, Applied Optics.

Wert, O., et al., "First Results from a Novel Curving Process for Large Area Scientific Imagers." (2012). Proc. SPIE 8453, 84531W.

https://petapixel.com/2017/06/01/microsoft-develops-curved-sensor-greatly-improves-image-quality/ (Jun. 1, 2017).

http://www.hrl.com/news/2017/10/25/hrl-receives-iarpa-award-curved-cmos-sensors-that-mimic-the-eye (2017).

https://petapixel.com/2014/04/02/sony-unveils-curved-sensor-technology/ (Apr. 2, 2014).

https://techxplore.com/news/2014-06-sony-biomimicry-cmos-sensors.html (Jun. 14, 2014).

https://www.foxnews.com/science/elon-musk-announces-lego-like-bricks-that-can-build-homes-in-a-day-or-two (Mar. 26, 2018).

Liu, B., et al., "Inhomogeneous-Collapse Driven Micelle-Vesicle Transition of Amphiphilic Block Copolymers." (2017). pp. 7106-7111. vol. 13, Soft Matter.

(56) References Cited

OTHER PUBLICATIONS

Yaghmaee, M.S. and Kaptay, G., "The Solubility of Nitrogen and Nitrides in Ternary Liquid Iron Alloys. The Limits of the 'Solubility Product' Concept." (2003). pp. 491-496. vol. 414-415, Material Science Forum.
Carve, M., et al., "3D-Printed Chips: Compatibility of Additive Manufacturing Photopolymeric Substrata with Biological Applications." (2018). vol. 9, Micromachines, DOI:10.3390/mi9020091.
Andersson, K.M., "Aqueous Processing of WC-Co Powders." (2004). Doctoral Thesis, Stockholm.
http://www.3dflow.new/it/3df-zephyr-pro-3d-models-from-photos/.
http://3dptv.github.io/wiki/additional_software/index.html (May 2014).
Tong, W., "Novel High Volumetric Energy Density Nanostructured Electrode Materials for Biomedical Applications." (2010). Rutgers University Doctoral Thesis, New Brunswick, NJ.

\* cited by examiner

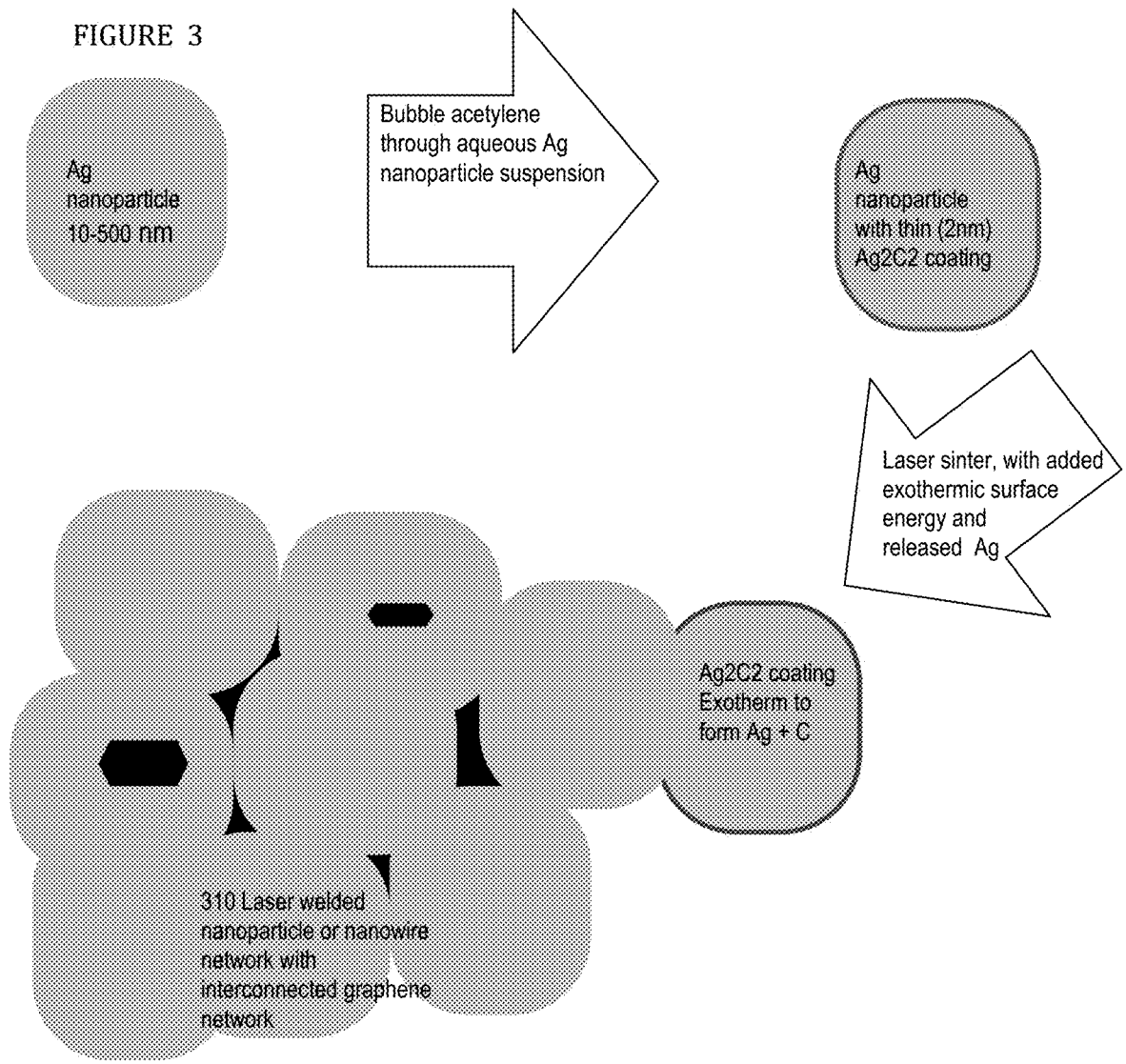

Apply piezoelectric build material, photonically sinter/pol, apply electrode, apply and sinter/pole, etc.

Photonically sinter and electrically pole Piezoceramic layers.

Cut kerf with cylinder rotation and axis advancement to form piezoelectric helix

FIGURE 14

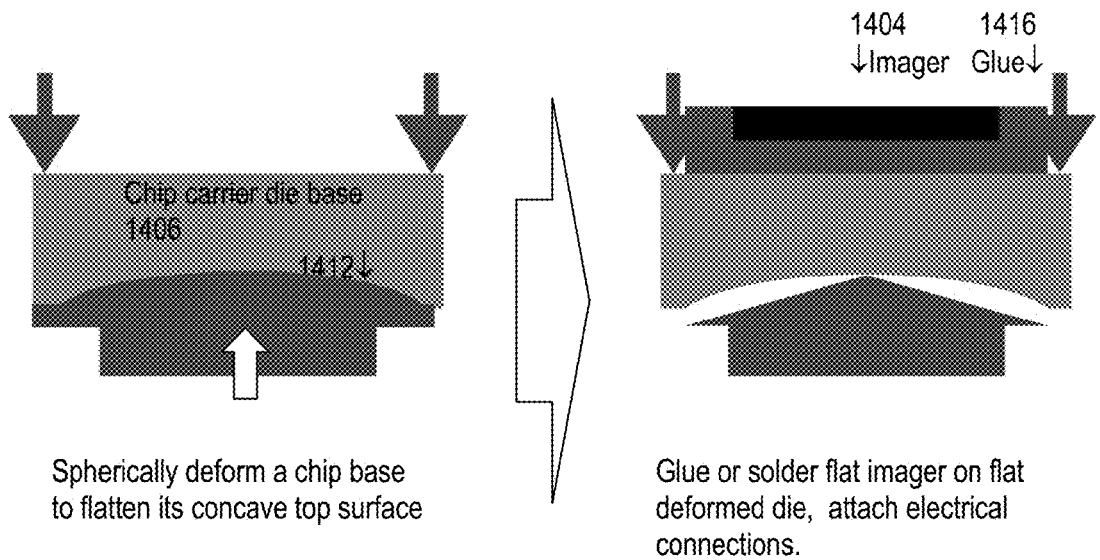

Spherically deform a chip base to flatten its concave top surface

Glue or solder flat imager on flat deformed die, attach electrical connections.

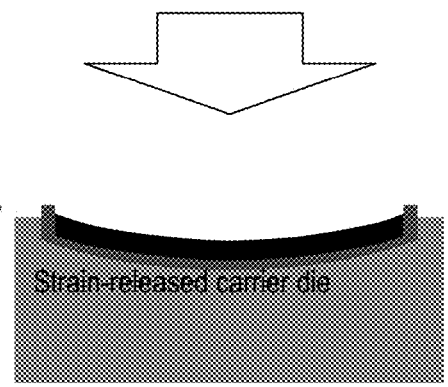

Release deforming pressure on chip carrier. Bonded imager ready for packaging is curved and bonded to resist wrinkle-ing. Edge glue can exert modest compressive pressure (even selectively more on corners) to facilitate strain accommodation in imager chip.

PROCESSES, COMPOSITIONS AND SYSTEMS FOR 2D AND 3D PRINTING

CROSS-REFERENCE TO RELATED APPLICATIONS

This application claims the benefit of U.S. application Ser. No. 16/677,424, filed Nov. 7, 2019, which itself claims the benefit of provisional U.S. Ser. No. 62/756,805 filed on Nov. 7, 2018. The disclosures of these applications are hereby incorporated by reference.

FIELD OF THE INVENTION

The present invention is directed to additive manufacturing and 3-D printing, including methods, equipment and compositions for additive manufacturing and 3D printing, as well as strong composite manufacture, electrical fabrication, and imaging improvement.

BACKGROUND OF THE INVENTION 3D and other additive printing systems are versatile technologies which can accelerate innovation and improve over traditional manufacturing methods for a wide variety of applications. Binder Jetting systems produce digitally designed objects by joining powdered metal, ceramic or polymer by jet deposition of binding agent. The object may be subsequently fused or sintered. Focused thermal energy technologies selectively apply light (eg, laser or other UV, VIS, IR) to melt or fuse objects from powder or wire as they are applied to a substrate. Powder Bed Fusion forms objects by applying thermal energy to fuse regions of a metal, ceramic and/or polymer powder bed, typically layer-by-layer. Specialized Direct Metal Laser Sintering forms objects by melting and fusing metal powder using a focused laser beam in a chamber of inert gas while other selective laser sintering processes sinter a metal or other powdered material while a roller adds new layers of material to form subsequent selectively patterned layers of the object sintered below the melting point to fuse the powder particles. Objects are also conventionally additively manufactured by Fused Deposition Modeling, by depositing material through a heated nozzle to build a layer that quickly hardens to form a substrate for subsequent layers. Laser scanned SLA and DLP vat polymerization processes apply localized irradiation to polymerize a light sensitive resin contained in a vat, in x, y planes, as the build platform moves through the resin along the z-axis. This can produce detailed 3-D structures, but the resins and monomers are difficult to work with and can be toxic. A resin can also be applied to a metal powder bed, to make metal structures for oven sintering, in relatively complicated additive manufacturing systems. These and other additive manufacturing processes and respective equipment are typically designed and controlled by established and conventional CAD and additive manufacture software and processors.

Water-based fluids, especially those without volatile reactive or toxic organic monomers, could make 3-D manufacturing of plastics, metals and ceramics easier, simpler and safer, especially for consumer, school, university and small business users where safety is important.

It is difficult to fabricate highly electrically conductive electrodes and other metallic conductors by additive manufacturing processes. For example, electrically conductive silver antennas fabricated by additive manufacture with thermoplastic structures lack full conductivity because of thermal limitations of the plastic materials when fusing extruded silver nanoparticles. Some problems can also be caused by gas release under silver reduction or melt conditions. It is also difficult to bond silver nanoparticles, NPs, and/or nanowires, NWs, at the low temperatures tolerated by plastics or other sensitive substrates. Thin transparent layers of silver nanowires and graphene are formed by flash decomposition of graphene oxide, but this releases $CO_2$ gas so is not optimal for thicker conductors.

SUMMARY OF THE INVENTION

Various aspects of the present disclosure are directed to additive printing methods, apparatus, and compositions relating to aqueous amphiphilic dispersions which undergo phase separation upon heating to a temperature at which a thermosensitive polymer component precipitates from aqueous solution, the lower critical solution temperature, LCST. A wide variety of thermally responsive polymers (including co-polymers) phase-separate from their aqueous solutions upon heating. Such polymers may be modified, tuned and adjusted in their solution, coagulation and phase separation properties by a wide variety of conventional technologies including copolymerization, molecular weight control, crosslinking, grafting, pH adjustment, use of surfactants and electrolytes, effects of co-dispersion components, molecular weight control, and composition blending with other polymers. The increase in the hydrophobicity of amphiphilic polymers into their precipitating state at elevated temperatures causes intra- and interchain association, aggregation and water expulsion, which is enhanced with increasing concentration of the thermosensitive polymer(s) concentration in the aqueous phase. The phase transition temperature LCST can readily be shifted to higher or lower temperatures by increasing the fraction of hydrophilic or hydrophobic groups of the thermosensitive polymer(s), respectively.

Storage-stable aqueous dispersions of build materials dispersed in aqueous solutions of such thermosensitive copolymers can be made less stable and more sensitive to thermal phase change, water expulsion and build material agglomeration by reducing the pH prior to 3-D printing use. Examples of thermally responsive amphiphilic polymers include Polyvinyl methyl ether, N-substituted poly[(meth)acrylamide]s, poly(N-vinylamide)s, 2-(dimethylamino)ethyl methacrylate, poly(oxazoline)s, protein-related polymers, poly(ether)s, polymers based on amphiphilic balance, elastin-like synthetic polymers, and their copolymers, block polymers, blends and grafts.

A wide variety of thermally responsive polymers phase separate from their aqueous solutions upon heating. A few polymers exhibit phase separation upon cooling. Such polymers may be modified, tuned and adjusted in their solution and phase separation properties by a wide variety of conventional technologies including copolymerization, molecular weight control, crosslinking, grafting, pH adjustment, use of surfactants and electrolytes, effects of co-dispersion components, molecular weight control, and composition blending with other polymers. Examples of thermally responsive amphiphilic polymers include Polyvinyl methyl ether, N-substituted poly[(meth)acrylamide]s, poly(N-vinylamide)s, poly(oxazoline)s, protein-related polymers, poly(ether)s, polymers based on amphiphilic balance, elastin-like synthetic polymers, and their copolymers, block polymers, blends and grafts.

The precipitation of thermosensitive polymers above their LCST causes water expulsion and aggregation, which can be enhanced by facilitating interpolymer chain association, enhancing intermolecular contacts (eg, by increasing polymer concentration, enhancing the exterior polymer interface more adhesive or attractive to other polymer clusters.

Copolymerization with inter-polymer reactive groups such as vinyl glycidyl ether or amine groups, also can makes thermosensitive polymer more beneficial for 3D and additive printing uses and formed structures. The properties of the formed 3D product can be designed based in part on the thermosensitive polymer. For example, PVME has a glass transition temperature well below ambient temperatures, and can form a compatible blend with microemulsified polystyrene build components. PNIPA has a higher glass transition temperature, and has epoxide-reactive amide groups which can facilitate its crosslinking at elevated temperatures with bi- or poly-functional epoxy crosslinking components in the deposited build material. Other crosslinking systems can be designed in the thermosensitive polymer aqueous build material composition such as those utilizing hexamethoxymethyl melamines, aziridines, polycarbodiimides, oxazolines, isopropenyl esters, oxiranes, enamines, amines, and unsaturation crosslinkers. Amphiphilic polymers can be grown from, or grafted to, build material particles to produce components which are stable in water suspension below the LCST, but can coalesce and aggregate on a substrate when appropriately heated above the LCST of the amphiphilic polymer(s). Copolymer moieties which assist intrapolymer attachment can increase thermosensitive polymer water expulsion and mass coagulation. For example, a small amount of pendant medium-chain alkyl group co-polymer component (eg, 2-16 carbon n-alkyl vinyl ether) copolymerized at random or endgroup positions in the water-soluble thermosensitive polymer chain can facilitate formation of an extended network at appropriate concentration (eg, above about 1% by weight of the water component) which enhances coagulation of the polymer above its LCST and expulsion of water when the aqueous build dispersion is heated above its LCST. The additive-formed and/or 3D-formed product or object with reactive polymer or oligomer components may be cured or fused by subsequent heat treatment, such as in an oven, light energy application or microwave heating. For example, PVME or PNIPA polymers (together with solid build materials coalesced therewith) with pendant amide, amine or glycidyl ether groups can more rapidly crosslink with epoxy, or epoxy-crosslinking-components and other crosslinkers upon heating.

Amphiphilic polymers can be grown from, or grafted to, build material particles to produce components which are stable in water suspension below the LCST, but can coalesce and aggregate on a substrate when appropriately heated above the LCST of the amphiphilic polymer(s). An additive thermoresponsive aqueous gold nanoparticle 3D printing fluid may be prepared by borohydride reduction of a gold salt in an aqueous solution of an amphiphilic polymer such as poly(vinyl methyl ether) (PVME), to form suspended particles which can assemble in the presence of polyelectrolytes such as poly(sodium-4 styrene sulfonate) and sodium salt of carboxymethylcellulose at low pH, upon raising the aqueous suspension temperature for example, from about 20 to 40° C. to initiate PVME precipitation from aqueous solution and interparticle association. Copolymer moieties which assist intrapolymer attachment can increase thermosensitive polymer water expulsion and mass coagulation.

In various aspects, the thermosensitive fluid technology of the present disclosure has a broad range of applications, uses and methods. In one set of systems, relatively high viscosity amphiphilic polymer solution dispersions of build material in a relatively low water content fluid can be selectively extruded below their precipitation phase change temperatures onto designed zones of a suitable substrate. The extruded fluid may be heated above the LCST to congeal the build material and separate water. The heating may be carried out by extruding onto a heated substrate, and/or by application of thermal energy to the extruded mass, such as by directed laser light. A thermosensitive aqueous dispersion may be applied with a roller, blade, spray or other means to a substrate in a uniform layer at a temperature below the LCST, followed by selective application of thermal energy in designed zones to selectively precipitate build material and amphiphilic polymer onto the substrate in the designed zones, while leaving the aqueous dispersion in unprecipitated form in the unheated zones. The dispersion may then be again applied for fabrication of subsequent layers by selective application of thermal energy to designed zones for those layers. Dispersions can be formulated so that they do not re-emulsify or re-disperse even when the temperature of the formed object is cooled below the LCST. Metastable emulsions and dispersions, and reactive particles with crosslinking design such as used conventionally in latex coating systems, are readily formulated to prevent re-dispersion. Additive manufacturing machines produce 3D (three-dimensional) objects by building up structured layers of material. Schematically illustrated in FIG. 1 is a system 100 illustrating examples of thermosensitive amphiphilic aqueous dispersion processes for additive manufacture. A variety of 3D manufacturing systems is described in Hewlett Packard US Patent publications (and other publications cited herein), which form green products which can be fused to produce finished products. Additive manufacturing machines useful herein can make 3D objects through the application of layers of a build material dispersed in an aqueous solution of a thermosensitive polymer which precipitates when heated above a phase change temperature (lower critical solution temperature, LCST). Other useful additive manufacturing machines can be adapted to make objects based on data in a 3D digital data model of an object created, for example, with a CAD computer program product. The model data may processed into slices or other defined structural components in accordance with conventional practice, each defining that part of the component, shape, layer or layers of build material to be solidified. For processes and equipment in which an aqueous suspension of additive material is selectively applied to the object being fabricated, with removal of the water component, the substrate can be maintained at a temperature higher than the LCST of the applied aqueous suspension, by appropriate heating means. For processes and equipment in which a selective heating pattern is applied to a layer of aqueous dispersion of build material in a solution of thermosensitive polymer, appropriate means for scanning a selective heating pattern (eg, laser scanner) or projecting a selective heating pattern (eg, a digital light processing projector), may be used to achieve selective deposition on the substrate to build the product or other object, in accordance with conventional practice. Any suitable build material aqueous dispersion may be used, including for example emulsified or suspended metals, composites, ceramics, glass and/or polymers, and processed to make a desired object which may be hard or soft, rigid or flexible, elastic or inelastic, electrically conductive or insulating.

Additive manufacturing systems may generate objects based on structural design data. This may involve a designer generating a three-dimensional model of an object to be generated, for example using a computer aided design (CAD) application. The model may define the solid portions of the object. To generate a three-dimensional object from the model using an additive manufacturing system the model data can be processed to generate slices of curved or parallel planes of the model. Apparatus for generating a three-dimensional object may comprise: a thermosensitive aqueous dispersion distributor for applying a layer of a dispersion of a build material in an aqueous solution of a thermosensitive amphiphilic polymer below its LCST to a substrate; and means for applying thermal energy onto the layer of build material in respective patterns derived from data representing a slice of a three-dimensional object to be generated to exceed the LCST of the aqueous dispersion, so that when energy is applied to the layer the polymer precipitates and the build material coalesces to form a slice of a three-dimensional object in accordance with the patterns. The disclosure also relates to methods of controlling a system to generate a three-dimensional object, comprising: obtaining control data, the control data derived from data representing a portion of a three-dimensional object to be generated; selectively applying a layer of build material by selectively raising the temperature of a dispersion of a build material dispersed in an aqueous solution of a thermosensitive polymer above its LCST to deposit build material and polymer in zones in accordance with the obtained control data. A process for generating a three-dimensional objects can involve forming a first layer of build material on a suitable support member by raising the temperature of an aqueous polymer dispersion above its LCST. For example, a viscous, high-solids dispersion may be selectively extruded onto a heated substrate to precipitate the polymer from aqueous solution and coagulate the build material dispersion in selected areas of the product design. In another example, a more fluid layer of aqueous polymer solution with dispersed build material in the range of from about 50 to about 500 microns in thickness may be applied to a substrate, followed by application of thermal heating above the LCST in selected zones to precipitate polymer and build material. This precipitation may be carried out at elevated temperature to further react the polymer and build materials or disrupt the dispersion stability mechanism(s) such as described herein, to limit or prevent re-dispersion at temperatures below LCST. Using thinner layers with smaller particle sizes of build materials may enable higher resolution objects to be generated but may increase the time taken to generate an object.

An apparatus for additive manufacture using an aqueous thermosensitive dispersion may comprise a build material distributor to provide a layer of build material on a support or the object being formed. Suitable aqueous suspension or other dispersion of build material distributors may include, for example, a wiper blade, a sprayer and/or a roller. Build material may be supplied to the build material distributor from a suitable reservoir. A build material distributor may conventionally move across the length (y-axis) of a support to apply an aqueous dispersion of build material. For example, a first layer of build material may be deposited on the support base, and subsequent layers of aqueous dispersions build material may be applied on a previously deposited layer of build material. The object being formed may also be submerged in a bath or vat of the aqueous thermosensitive build material dispersion, with its upper surface just slightly below the surface of the aqueous thermosensitive dispersion. The temperature of the bath may be maintained at just slightly below the LCST, so that the aqueous dispersion remains stable in bulk. A thermal heating energy source such as a scanned laser beam or a heating light image is applied to the aqueous dispersion surface which has been applied on the substrate by the distributor, or which is the top thin layer of the bath, in order to heat a build layer pattern in the aqueous suspension and/or the substrate surface, to a temperature exceeding the LCST in the pattern zone adjacent the substrate, for example by say 3 to 300 degrees Celsius, to cause the thermosensitive polymer to precipitate and coagulate the build material components to form or coagulate against the object surface in the build layer pattern. The distributor may subsequently apply another layer of aqueous thermosensitive build dispersion, or the object being formed may be lowered in the bath (or the bath level raised) to form a new thin surface layer of build fluid. Prior to reapplication of another layer of aqueous build dispersion, the formed object may be processed in a suitable manner for processing of the deposited material. For example, the newly-deposited surface may be heated or UV irradiated for crosslinking, reacted with a vapor reactant in the equipment headspace, or further built with extruded build material or applied pre-formed shaped materials or components. In one example, a support base for the object being formed is moveable in the z-axis such that as new layers of build material are deposited a predetermined gap is maintained between the surface of the most recently deposited layer of build material and lower surface of the aqueous dispersion distributor, or a predetermined thin layer of the aqueous dispersion is maintained above the top surface of the object being formed. The thickness of the aqueous dispersion layer may be designed to accommodate different layer thicknesses and material dispersions, depending for example on factors such the build material properties, the density of the dispersed build materials in the aqueous dispersion, the processing and forming reactions involved, the desired degree of detail or deposit precision, and the type of precipitation utilized. In another example the thickness of a layer of aqueous dispersion formed by the build material distributor may be in the range of from about 50 to 500 microns, although in other examples thinner or thicker layers may be provided. As indicated, 3D printing systems may comprise an energy source to apply energy to aqueous build material dispersions to cause precipitation of the polymer with build material. In one example the energy source may be an infra-red (IR) or near infra-red light source. In one example the energy source may be a heater which maintains the object being formed at a temperature above the LCST of an aqueous dispersion being extruded selectively in a pattern thereon. In addition, a thermosensitive aqueous polymer solution with dispersed build material can be "jetted" onto a heated substrate. The dispersion can be printed in a selective pattern by inkjet mechanisms and equipment in accordance with convention practice and design. Inkjet printer systems can discharge droplets having drop volumes of from about 10 picoliters, up to 100 nanoliters or more. Thermal inkjet systems can be operated with cold aqueous dispersions with good engineering design (even including a pure water chamber envelope), but the thermal heat driving mechanism can tend to coagulate or precipitate the aqueous dispersion without careful design and operation. Piezoelectric inkjet printer apparatus and printing methods are preferred in which an aqueous thermosensitive dispersion is processed through the printer mechanism at a temperature below the LCST without substantial heat input to the droplets discharged from the printer onto the substrate heated above the LCST in a build pattern for the 3D object being fabricated. An advantage of aqueous thermosensitive droplet jetting is that a plurality of different build materials may be readily applied, simultaneously or seriatim. Electrically conductive patterns may be readily applied with one (or one set of) jetting nozzles, while dielectric or semiconductive patterns are applied from another nozzle or set of nozzles. Different jetting nozzles with different droplet size may be utilized in the same equipment and process, or example a large droplet size may be used for bulk build material addition, while a small droplet size is used for edges and small feature definition.

Thermosensitive aqueous dispersions of may include an emulsion or suspension in an aqueous thermosensitive polymer solution of a suitable build material for additive manufacturing or forming a 3D object. The aqueous dispersions may be fluids, pastes or gels. Useful build materials include emulsified, suspended or otherwise dispersed particulate organopolymeric materials such as polystyrene, various nylons such as nylon 12, nylon 6, nylon 9, nylon 11, nylon 12, nylon 66, nylon 612, polymethacrylics, PA 2200, polyethylene, polyurethane, ABS, polypropylene, polyesters, polysiloxanes, polycarbonates, polyether ketones, polyacrylates, polystyrenes, polyacetals, other engineering plastics, core shell polymer particles of these and/or inorganic materials and mixtures thereof which are suspended or emulsified or otherwise dispersed in an aqueous solution of a thermosensitive polymer. In other examples, other suitable build materials may be emulsified or suspended or otherwise dispersed in an aqueous amphiphilic polymer solution. Other materials may include, for example, powdered metals, powdered composite materials, powdered ceramics and powdered glasses, and their precursors, suspended, emulsified or otherwise dispersed in an aqueous solution of a thermosensitive polymer. Useful ceramic particles for dispersion in thermosensitive polymer solutions include inorganic oxides, carbides, and nitrides such as alumina, glasses, silicon nitride, silicon dioxide and silicates, zirconia and zirconates, titanium dioxide and titanates as well as mixtures thereof. Di-, tri-, and monocalcium silicates, wollastonites, etc can be used as dispersed build materials in the thermosensitive suspensions employed herein, and may usefully react with remaining water to minimize shrinkage of the green 3D printed object. The thermosensitive polymer can be incorporated to strengthen the finished product, especially if it is reacted or crosslinked (eg by Ca ionic crosslinks or other crosslinking reactions) to reduce water sensitivity. The aqueous dispersion of build materials may include similarly sized particles or differently sized particles. For more efficient compaction, a range of differently sized particles may be preferred. For example, an average size of the particles of the dispersions of build materials may range from about 1 micron to about 500 microns. Submicron dispersed particles (eg, nanoparticles of from about 5 to about 900 nanometer maximum dimension particle size) are useful for detailed and small-feature object component or feature manufacture. Aqueous dispersions with submicron emulsified or suspended components can be extruded through very small orifices for application in very precise patterns, jetted in droplet form in precise patterns onto a substrate, and can be applied in very thin layers (eg less than 100 microns thick) for coagulation on an object substrate surface by precise laser pattern or digital projection light pattern heating to coagulate a very finely detailed design rule capability.

The aqueous thermosensitive polymer dispersion can desirably comprise a conductive or semiconductive material for fabricating conductor or semiconductor patterns, devices, electrodes, capacitors and other electronic components. Some specific examples of conductive and/or semiconductive materials for dispersion in aqueous thermosensitive polymer solutions include carbon nanotubes, graphenes, silver nanoparticles, quantum dots, metal acetylides, silicon nano- and micron scale particles, and the like. Examples of the conductive materials include metallic (e.g., silver, copper, gold, platinum, palladium, tungsten, iron, etc.) nanomaterials (e.g., nanoparticles, nanorods, nanowires, nanotubes, nanosheets, etc.), conductive oxides (e.g., indium tin oxide, antimony oxide, zinc oxide, etc.), conducting polymers (e.g., poly(3,4- ethylenedioxythiophene) polystyrene sulfonate (PEDOT:PSS), polyacetylene, polythiophenes, and other conjugated polymers, etc.), carbonaceous nanomaterials (e.g., graphene (single or multi-layer), carbon-nanotubes (CNTs, single or multi-walled), graphene nanoribbons, fullerenes, etc.), and reactive metal systems (e.g., metal oxide nanoparticles, which can be reduced after being deposited from the thermosensitive solution). Carbonaceous nanomaterials and metallic materials are stable at very high temperatures (i.e., at the sintering/processing temperatures for 3D printing polymers and ceramics, e.g., up to 3400.degree. C.), and thus may be suitable for forming electronic component(s) on and/or in ceramic build materials.

Examples of the semiconductive material include semiconducting nanomaterials (nanoparticles, nanorods, nanowires, nanotubes, nanosheets, etc.), silicon (including n- and/or p-doped particles), semiconducting metal oxides (e.g., tin oxide, antimony oxide, indium oxide, etc.), semiconducting polymers (e.g., PEDOT:PSS, polythiophenes, poly(p-phenylene sulfide), polyanilines, poly(pyrrole)s, poly(acetylene)s, poly(p-phenylene vinylene), polyparaphenylene, any other conjugated polymer, etc.), and semiconducting small molecules (i.e., having a molecular mass less than 5,000 Daltons, e.g., rubrene, pentacene, anthracene, aromatic hydrocarbons, etc.). Some specific examples of the semiconducting nanomaterials include quantum dots, III-V or II-VI semiconductors, Si, Ge, transition metal dichalcogenides (WS2, WSe2, MoSe, etc.), graphene nanoribbons, nanodiamond particles, semiconducting carbon nanotubes, and fullerenes and fullerene derivatives. Examples of aqueous thermoresponsive solutions which precipitate build materials upon heating above their LCST include emulsions, suspensions and other dispersions.

An additive manufacture thermoresponsive aqueous gold nanoparticle 3D printing fluid may be prepared by borohydride reduction of a gold salt in an aqueous solution of an amphiphilic polymer such as poly(vinyl methyl ether) (PVME), to form suspended particles which can assemble in the presence of polyelectrolytes such as poly(sodium-4 styrene sulfonate) and sodium salt of carboxymethylcellulose at low pH. Upon subsequently adding an unreacted thermosensitive polymer into the solution-suspension (eg, 1-2 wt % of the solution of high molecular weight PVME), a thermosensitive amphiphilic suspension is prepared. Upon raising the aqueous suspension temperature for example, from about 20° C. to about 45° C., PVME precipitation from aqueous solution is initiated together with interparticle association and water expulsion for deposition onto a suitable form or other substrate.

In other aspects, of the present disclosure, energetic acetylide components are utilized in object manufacture, including but not limited to additive manufacture. For example, silver nitrate or cuprous chloride, CuCl, 1 g, may be dissolved in 500 ml 5 wt % aqueous ammonia solution maintained at 23° C. in a safety reaction vessel. 10 grams of Silicon nanopowder and 4 grams of PVME are also dissolved in the solution. The silicon particles may have a monomolecular glycerine coating. Pure Ar gas is bubbled through the solution at a flow rate of 50 mL/min for 30 minutes to purge oxygen from the reaction vessel and solution. Then, 1% acetylene gas or 10% methyl-acetylene, propyne gas (wt %) in Argon is slowly introduced into the reaction vessel at 5 mL/minute with continuous stirring. Silver or copper acetylides or —CC≡CH3 precipitates, respectively, are deposited on the silicon nanoparticles. The dispersion may be used as a thermosensitive build material for Lithium battery electrode manufacture by 3D printing. The thermosensitive aqueous dispersion may be selectively heated to a temperature such as about 35 to 50 Celsius upon application to convert it to a dewatered, designed pattern on a substrate, then dried in a vacuum at 50-Celsius, and subsequently laser or otherwise heated to a temperature above about, say, 250-300 degrees Celsius, to form a graphene/graphite-metal encapsulated lithium-silicon battery electrode structure component. The graphene-graphite-carbon encapsulation provides long-term cyclic lithium charge-discharge stability. As another example, five wt % of Silver (I) nitrate may be dissolved in aqueous ammonia solution, NH3: 1.9 wt %, based on water weight, which also contains 1-10% by weight dissolved PVME and/or PNIPA. Acetylene diluted with nitrogen may be introduced into the solution at a low flow rate while the solution is mixed and/or subjected to ultrasonic irradiation at 20 kHz. A solid precipitate (Ag2C2) is produced after 10-30 min under flowing gas.

Co, Cu, Fe, Ni and Ag acetylide coated particles may be readily prepared by precipitation reaction onto the respective particles in a suitable solvent. Similarly, Co, Cu, Fe, Ni and Ag acetylide particles may form the cores for deposition of metals and other material thereon to form internal-heat generating particles for subsequent composite manufacture. For example in this regard, silver nanoparticles may be formed or dispersed in a 5% aqueous ammonia solution at a weight ratio of 1:20 silver-to-aqueous solution, with rapid stirring, vortexing and/or low-power ultrasonic mixing. The aqueous solution may comprise, for example, from about 1 to about 5 weight percent of an amphiphilic polymer such as PVME base on the weight of the solution. Copper chloride may be dissolved in the ammonia solution with dispersed Ag particles, at a weight ratio of 1:100 CuCl-to-aqueous NH3 solution in a safety reaction vessel maintained at 25° or below to prevent acetylide polymerization. Oxygen is removed by bubbling pure argon through the solution/suspension. After removing oxygen, Argon containing 0.1 volume percent acetylene is introduced slowly into the vessel, either directly bubbled through the solution with rapid mixing, or into the headspace with rapid mixing. A brown $Cu_2C_2$ precipitate is coated on the silver particles, which may be used directly as a build solution, or which can be filtered and washed with distilled water and methanol, suspended in dehydrated methanol in an ultrasonic bath, and filtered again for purification. Subsequently the $Cu_2C_2$-coated Ag particle precipitate may be suspended in an appropriate solution, such as a 3 weight percent PVME and/or PNIPA solution, or dried in a vacuum desiccator for storage and subsequent use. CAUTION: dried $Cu_2C_2$ particles may be explosive.

Similarly, Co, Cu, Fe, and Ni acetylides may be prepared for direct carbon-reinforced alloy composite manufacture without use of an aqueous thermosensitive solution. For example, iron acetylide (FeC2) particles and coatings may be manufactured by reaction of $FeCl_2$ with acetylene and/or CaC2 in acetonitrile solution. For example, iron nanoparticles are suspended with ultrasonic and/or mechanical stirring in acetonitrile in a weight ratio of 5:95 Fe-to-acetonitrile at ambient temperature under water and oxygen-free conditions. 5 weight percent of ferrous chloride FeCl2 based on the weight of the iron nanoparticles, is dissolved in the acetonitrile suspension, which may be raised to a temperature of about 50-80° C. while avoiding polymerization of the acetylide component at elevated temperatures. A matching molar amount of fine particles of Calcium Carbide CaC2 (~2.5 wt % of iron particles) is added to the acetonitrile (or at least an equivalent amount if acetylene is slowly introduced and absorbed into) the suspension, and reacted to produce coatings of iron acetylide FeC2 on the iron nanoparticles. The coated iron nanoparticles may be carefully purified in inert atmosphere (FeC2 is easily oxidized in air). Heating of FeC2 at temperatures higher than about 250° C. induces segregation of metallic iron and carbon. The segregated carbon can grow as graphitic sheets adjacent the iron.

Useful build materials for metal product manufacture also include low alloy ferrous material powders which can be water atomised or sponge iron powders with elemental alloying additions such as carbon, nickel and molybdenum. Stainless steel powders such as AISI 300 and 400 series stainless steels are useful, as well as precipitation hardening stainless steel grades such as AISI 17-4 PH. Copper alloy additive manufacture can typically use fully pre-alloyed powders or elemental mixes. Aluminium and titanium alloy powders are also useful, such as CP—Ti and Ti-6Al-4V, Ti-7Fe-5Zr and Ti-6Al-5Nb. In this regard, it is noted that Titanium powder metallurgy conventionally can employ titanium hydride powder, a reducing material which evolves hydrogen upon sintering, which can be used to reduce thermosensitive polymer hydrophilicity, especially at elevated reaction temperatures. Hard and heavy build materials for additive manufacture herein can comprise a mixture of hard particles such as tungsten or other hard metal carbides, nitrides or carbonitrides and metal binder powder such as is cobalt powder, suspended in a thermosensitive amphiphilic aqueous polymer solution. High molecular weight thermosensitive polymers are preferred for extrusion additive manufacture extrusion processes in which a high viscosity, high build material solids content dispersion is extruded and applied to selective designed build areas below the LCST, and heated above the LCST upon application to the areas/zones to apply the build material (eg, by the substrate being at elevated temperature above the LCST, and/or the application of selective laser heating). Preferred particulate aqueous thermosensitive amphiphilic dispersions useful herein for 3D manufacture of metallic, ceramic and other objects may comprise from about 10 wt % to about 85 wt % water, from about 1 wt % to about 15 wt % of an amphiphilic thermosensitive polymer, and from about 5 wt % to about 80 wt % of a build material for 3-dimensional or other additive manufacture, based on the total weight of the aqueous solution and dispersion. The build material preferably has an average particle size in the range of from about 0.1 micron to about 500 microns. A mixture of particle sizes it typically preferred for achieving high build material density in the finished product. The dispersed particles may have weakly bound ligands at their surface, preferably supporting weakly stable or metastable aqueous suspension that is readily disrupted upon thermosensitive polymer precipitation and particle agglomeration. Weakly bound ligands include molecules that attach to the nanoparticle surface through an amine, carboxylic acid, amide or pyridine functional group. Examples of such molecules include dodecanoic acid, triethylenetetramine, and 4-dimethylaminopyridine, poly(ethyleneimine).

The previously described fullerenes, conducting or semi-conducting metal oxides, and conducting or semi-conducting polymers may be semi-conductive, in that they have a finite conductivity. However, this conductivity may often be sufficient for conductive applications. The material may be considered conductive or semi-conductive depending upon the geometry and/or in what combination with other electronic components it is utilized. Some of the conductive or semiconductive materials are inherently electronically active or become electronically active after thermal precipitation or coagulation from the aqueous thermosensitive polymer solution. Others of the conductive or semiconductive materials have their electronic property enhanced or activated when exposed to a treatment. The treatment may be annealing or a chemical treatment (e.g., chemical interaction with another activating agent).

When the green body formed object fabrication is complete, it may be exposed to several heating stages (e.g., initial, lower temperature heating to further densify the green body 31, followed by higher temperature sintering), or it may be exposed to a single heating stage that sinters the green body into a finished, fused object. Prior to heating, the green body may be removed from the fabrication bed or chamber (or other support member) and may be placed in a suitable heating zone or furnace. Examples of a heat source or means for fusing or sintering the green body include a conventional furnace or oven, a microwave heating apparatus or devices capable of hybrid heating (i.e., conventional heating, IR heating and/or microwave heating). Examples of a radiation source include a UV, IR or near-IR curing lamp, IR or near-IR light emitting diodes (LED), halogen lamps emitting in the visible and near-IR range, or lasers with functional electromagnetic wavelengths. When a radiation source is used, the type of radiation source may depend, at least in part, on the type of build materials being fused and/or sintered. Other finishing operations may also be employed for finishing green products. For example, particulate silicates such as di-, tri-, and monocalcium silicates, wollastonites, and the like can be used as dispersed build materials in the thermosensitive suspensions employed herein. The green objects formed from additive manufacture of thermally destabilized aqueous thermosensitive amphiphilic dispersions may be subsequently processed at elevated temperature and carbon dioxide atmosphere to produce strong finished cementitious products.

The deposited build materials formed by the phase change precipitation of the aqueous thermosensitive dispersion to build an object, can be further heated, and dried, fused, and/or reacted. In addition, as described herein, the build object can be heated to cause or assist aqueous suspension water expulsion and thermdeposition; the heated object build environment may also have a partial vacuum or heated gas atmosphere flow to remove retained moisture as to heated object is being formed. The additional processing can be carried out, for example, in a manner like that of United States Patent Application 20180243990 published Aug. 30, 2018. When multi-stage heating is utilized, the green body may first be heated to an intermediate temperature, such as ranging from about 80 C to about 600 C to remove moisture and partially consolidate or densify the formed objects of manufacture.

Regarding viscosity, higher viscosity from more dissolved polymer, and/or higher molecular weight thermosensitive polymers, assist dispersion of build components and maintains suspension. For example, the aqueous thermosensitive dispersion may have a dynamic viscosity in the range of from about 5 cps to about 50,000 cps at a temperature below its LCST (eg, 25° C. for aqueous PMVE or PNIPA solutions) and a shear rate of 5 $s^{-1}$. High molecular weight thermosensitive polymer solutions can provide high viscosity, for example for extrusion paste suspensions of build materials with a viscosity of 250,000 centipoise, which are applied in specific patterns at a temperature below the LCST, followed by heating above their LCST to precipitate the polymer and release the water content of the suspension, leaving the build material in the applied areas or zones.

An important aspect of the present disclosure is that the precipitated/congealed build material and thermosensitive amphiphilic polymer which is applied at or heated to, a temperature above the LCST to manufacture the 3D object or other additive manufactured product, may be crosslinked or otherwise reacted, destabilized or structurally modified to limit or prevent redispersion of the build material if the formed congealed component is reduced in temperature below the LCST. In this regard, emulsion and suspension conditions may be designed to be disrupted upon precipitation and agglomeration of dispersed build materials. Surface surfactants (especially in metastable dispersions/emulsions) can be sufficiently disrupted by the precipitation and agglomeration that the dispersion does not reform (especially in the absence of strong mixing). Thermosensitive polymers such as PVME can blend with compatible hydrophobic polymers such as polymerized styrene at elevated temperatures above the LCST, limiting redissolution thereof at temperatures below the LCST. At temperatures above the LCST, agglomerated build materials having surface reactive moieties can be reacted and crosslink with each other and/or the precipitated thermosensitive polymer, which itself can be provided with reactive moieties, as described herein. The thermosensitive polymer may be reduced by a reducing agent to decrease its hydrophilicity below its initial unreduced properties, such as by reaction with a reducing agent such as titanium hydride, or a borohydride in the build material. In this regard, elevated reaction temperatures can facilitate reduction.

A part may be built upon an initial "generic" object which is preformed of a structural build material having cure or sintering characteristics similar to that of the build material which will be deposited. In this way, the efficiency of conventional part manufacture, and the flexibility of 3D fabrication can be realized by utilizing advantages of each technology. Additive manufacture is extremely flexible in terms of the scope and diversity of the objects which can be manufactured, but may be relatively "slow" in terms of fabrication speed. After manufacturing one object, a 3D manufacturing machine and process can manufacture an entirely different product in terms of size, shape and build material. However, 3D and other additive manufacturing tends to be relatively slow in terms of mass of material processed and formed into manufactured products. The applied layers of build material can be relatively thin, with many layers required to reach the finished product dimensions of height, width and length. Products can be approximated by an assembly of "generic" shapes, which fit within the exterior surface of the product to be manufactured by 3D printing. A conventional example is the approximation of objects by "Lego®" brand interconnecting blocks, in which rectangular interconnecting bricks and other regular flat-and-curved-surfaced geometric shapes can be assembled to form the overall shape of an object, albeit without fine surface detail or form, fit and finish of a designed and mass-manufactured product. In accordance with some aspects of the present disclosure, such a core portion of an object may be assembled with an assembled or interlocking structure formed from such generic bricks, beams, or sheets of standardized build materials like those materials to be used in the finishing additive-manufacture off the object. A binding agent metal, plastic or ceramic slurry may be used if desired to unify the green generic building block assembly for subsequent application of 3D printed or other additive manufactured build material thereon. For example, generic bricks of metal alloy powder may be mixed with a polymeric binder and injection molded to form "Lego®" like "green" interlocking shapes or bricks. The binder and build material may be substantially the same as the build material and jetted binder (minus solvent) to be applied to the assembled generic building blocks, such as the HP binder materials used in the HP jetting build systems cited herein. The generic sub-structure of a designed object is readily designed by software and built robotically, as well as by hand. Hollow-core slabs, and other regular interlocking geometric shapes, sometimes referred to as voided slabs or hollow core planks, are useful for product mass reduction. The "green" generic interlocking components may also include formed metallic elements to assist prevention of warping or other distortion during subsequent furnace/oven fusing. The construction of the core generic brick structure for a new product is easily determined by hand (manually) or by software, and may also be assembled by hand or machine to form the green base for the new product, saving both time and manufacture cost over full additive manufacture. The assembled core structure may then be used as the substrate for automated additive manufacture of the new product. In addition to simple conventional oven/furnace fusing or sintering of the green objects can produce finished unified products, while hot isostatic pressing (HIP) can further reduce porosity of metal and ceramic materials manufactured by powdered metal and powdered ceramic additive-manufactured objects, by processing the green object under high isostatic pressure and high temperature.

The green generic "building block" components and objects may be made by conventional methods such as powdered metallurgy (PM), in which the green building blocks are formed by pressing metal powder and a binder in a die, or metal injection molding (MIM) of metal powder in a binder to form green generic building blocks. The building component does not need to be changed for new products, which are fabricated by additive manufacture over an assembly of generic green building blocks, then furnace-processed together to form the finished product. The binding agent for the green building blocks may be a dense thermosensitive polymer of the same type to be used in additive manufacturing, or a different binder. However, the building blocks should best have a process volume shrinkage upon fusing/sintering or other final processing, which is within 10 percent, and more preferably within 5 percent of the process volume shrinkage of the additive manufactured component volume of build material applied by additive manufacture over or onto the assembled generic building blocks.

Jetting of thermosensitive dispersions is an example of an important method for rapid and efficient object builds, especially when combined with generic building block core object assembly. In this regard, multiple droplet jetting systems with different volumetric droplet size and different feedstock may be used to do a fast build, and a finished dimension build. Optical or other sensor feedback can be used to adjust the object being built, as it progresses. For example FIG. 10 illustrates an object 1102 being built in a drop-jetting machine apparatus 1100. The machine 1100 comprises a plurality of movable drop-generating jets 1104, 1106, 1108 . . . which may project from the top and sides of the inner wall of the build chamber 1110. The machine further comprises a plurality of imaging cameras 1130 focused on the build object, operating with 3-D imaging means (not shown) to construct a 3-D digital image representation of the object 1102 being fabricated. Suitable 3-D software in general purpose computer systems may be utilized to accomplish this function, as well as the overall operation of the fabrication apparatus 1100. The machine 1100 further comprises a heatable build stage 1112 which is movable under machine program control in a vertical direction 1114, and can rotate 360° about its axis, to position the build object adjacent to appropriate, respective droplet jet systems, which are also movable under program control. A separator sheet 1132 may be placed on the stage 1112 to facilitate easy removal of the build object after its completion in the equipment 1100. In operation, a drop generating jet system such as 1106 can project relatively large droplets of an aqueous dispersion onto the stage which is heated to a temperature above the LCST of the dispersion droplets by appropriate heating means. Metal powder builds are relatively good heat conductors for base platform supplied heat, but infrared and microwave radiators with object thermal sensor feedback control are also generally useful, especially for ceramic and polymer builds. The jet large-droplet-generator 1106 forms and directs droplets of an aqueous dispersion of a build material such as metal alloy powder (eg, iron or copper alloy) to program-controlled locations on the object being fabricated. The generator 1106 is a rapid-build generator which is adapted to apply relatively larger droplets to the object surface. The dispersion droplets may have a mixture of relatively larger build particles and/or fibers or nano wires, and smaller particles designed to form a compact mass upon sintering. Upon contacting the heated platform stage 1112, the thermosensitive polymer of the projected droplets precipitates on the heated object under fabrication together with the dispersed build particles. After finishing a thin base 1116, the automated equipment may apply a green core structure 1118 formed of generic green "blocks" 1119 of the build materials being deposited by the equipment 1100.

A separator sheet 1144 may be placed on the stage 1112 prior to droplet generation to facilitate easy removal of the build object after its completion in the equipment 1100. The generic block structure 1118 may have internal voids 1120, strengthening screens 1122, prefabricated functional components, and the like. The generic block structure fits within the exterior surface of the designed object being fabricated in the equipment 1100. It generally has the same centering and shrinkage and processing characteristics as the build materials being applied by the equipment 1100. After insertion of the generic block core, the fabrication of the object proceeds with multiple jet drop generating devices adding build material in accordance with the object design. Relatively large build zones volumes may be applied with larger jet drop application onto the heated object. Smaller and surface feature zones and volumes are applied by jet droplet generators such as 1108 which produce very small droplets which may comprise very small, even nanoscale build materials in aqueous dispersion. The 3-D structure of the object under fabrication is monitored by the multiple cameras, which generate a 3-D digital representation of the object under fabrication. This 3-D representation is compared with the final desired shape and quality of the object to be fabricated and with the programmed design build plan for the object within the controller of the equipment 1100 and compared with the designed, expected shape and condition as fabrication progresses. Fabrication may be adjusted as fabrication proceeds. Upon completion of the object, the object is removed and sintered or otherwise post processed in accordance with conventional practice.

As illustrated in FIG. 10, a thin walled electrically-conducting aluminum or copper cylinder may be rotationally mounted about its longitudinal axis adjacent an aerosol jet printer or inkjet type droplet generating jet printer (not shown), and heated to a moderate temperature, such as about 50° C. The aqueous dispersion jet printer mechanism is programmable and movable along the axis of the cylinder. A piezoelectric build material dispersion in an aqueous solution of a thermosensitive polymer such as PVME or PNIPA is uniformly applied along the exterior surface of the heated cylinder. Upon contacting the heated cylinder, the dispersion coagulates and densifies while expelling water, which can drain from the cylinder and/or evaporate. After depositing a layer thickness, an suitable electrical potential for photonic poling/sintering is applied across the deposited layer, for example a coercive field of 10-100 kV per centimeter, may be applied outwardly in a radial direction from the thin-walled metal cylinder. The polling field may be generated from the metal cylinder to an opposite or ground potential in the build chamber, or a transparent conducting cylinder or sheet such as a conductive ITO interposed between the photonic sintering light source and the rotatable piezoelectric-particle-coated cylinder. Alternatively, the sintering may be by laser light pulse directed to the cylinder surface on either or both sides of a narrow electrode near the cylinder surface. For photonic polling, the electrically conductive cylinder may be preheated to a moderately high temperature such as about 300-500° C. to remove remanent water and facilitate photonic sintering and poling. A very thin barrier layer of a material which is mechanically strong and chemically inert toward the piezoelectric building material, such as aluminum oxide or silicon dioxide, may be applied to the external surface of the metal cylinder prior to piezoelectric material deposition. Small amounts of a sintering aid such as $PbO—Cu_2O$ may be included in the aqueous dispersion to reduce a PZT sinter temperature, in accordance with conventional practice. Multiple layers may be fabricated by laminating with repeated sintering, so that applied voltage can be reduced. Metal electrodes can be applied with metal nanoparticle suspension build materials (with sintering), vapor deposition, and the like. For example, by radially layering 10 or 100 bimorph structures to form the helical bender, the applied driving voltage can be reduced by approximately 10 or 100 times, respectively, at the expense of multiplying the number of electrode connections to drive the actuator. The metal electrode connecting terminal zones may be left bare of piezoelectric material by appropriate program control. Moreover, by stacking or layering layers of different composition, functionally graded piezobenders may be fabricated which are more efficient in power usage, as is described below. Also in accordance with the present disclosure, electrically conducting magnetic shape memory alloys ("MSAs") such as NiMnGa and CoFe based alloys can also be applied in additive manufacture processing. MSAs can have larger shape change than piezoelectrics, together with high force and work efficiency. The activating magnetic field can be as low as 30 mT for MSA elements. MSA magnetic-field-induced strain can be at least 10%, and efficiency can be over 90%. The MSA can be applied as an aqueous slurry as described herein, or otherwise. By melting/sintering the MSA in a strong magnetic field (eg, FIG. 2), and cooling/recrystallizing in the magnetic field, the crystal orientation can be controlled.

BRIEF DESCRIPTION OF THE DRAWINGS

This patent or patent application file contains at least one drawing executed in color. Copies of this patent or patent application publication with color drawing(s) will be provided by the Office upon request and payment of the necessary fee.

FIG. 3 is a schematic progressive illustration of silver (or copper) particle processing with expothermic acetylide components.

FIG. 14 is a schematic process illustration of producing a curved imager by affixing an imager chip to a strained substrate, and releasing the substrate strain to form the chip attached thereto into a curved configuration for use in an efficient camera system.

DETAILED DESCRIPTION OF THE INVENTION

As discussed, aspects of the present technologies relate to additive manufacturing, which can be accomplished by a variety of different equipment systems and methods. In this regard, one example of an additive manufacturing machine can comprise: a first device to form a first layer of thermosensitive aqueous build material; a second device to apply optical energy to aqueous build material applied by the first device; and a controller to execute instructions to: cause the first device to form a first layer of thermosensitive build material; cause the energy source to apply optical energy to the layer to precipitate the thermosensitive polymer and build material in designed zones to form an object slice; cause the first device to form a second layer of build material on the deposited slice; and cause the energy source to apply optical energy in a predetermined pattern to the second layer to precipitate the polymer and build material in the second layer to form a second object slice.

Figure 1:
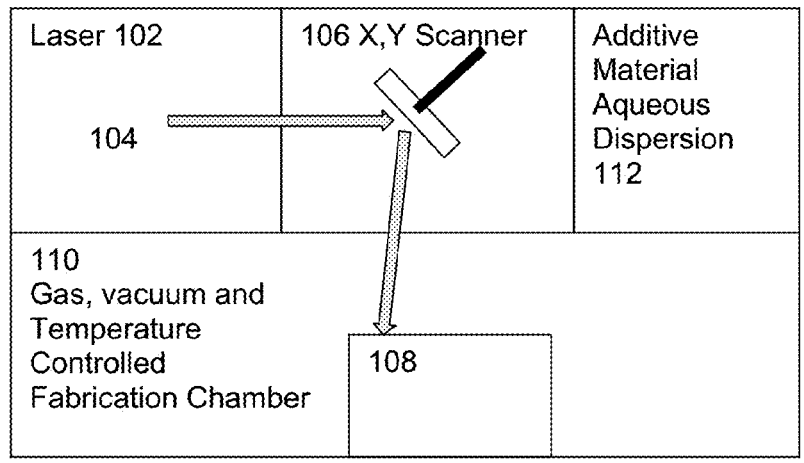
FIG. 1 is a schematic illustration of a generic laser-powered additive manufacturing system which is useful in a variety of embodiments and compositions herein.

Schematically illustrated in FIG. 1 is a 3-D additive manufacturing system 100 comprising a laser power means 102 for producing a laser light beam 104, a scanning means 106 for scanning the application of the laser light beam onto a workpiece 108 in a fabrication chamber 110, and an additive build material source means 112 for supplying a dispersion of additive build material in a thermosensitive aqueous polymer solution below its LCST to the workpiece. Heating of the aqueous dispersion to a temperature above its LCST on the workpiece by the laser beam 104 operated under programmed control, deposits build material (and thermosensitive polymer) on the workpiece in the selectively heated, programmed locations. Suitable additive manufacturing systems include Optomec Design Company (Albuquerque, NM) LENS systems, EOS GmbH Electro Optical Systems (Krailling, Germany) additive manufacturing systems, Concept Laser QM coating systems, General Electric additive laser manufacturing systems, and e-Manufacturing Solutions equipment such as EOSINT μ60 additive laser manufacturing systems. These are typically high-power laser systems which need only be operated at low power to raise the aqueous dispersion temperature above the LCST. The additive manufacturing chamber may be enclosed for atmospheric control or vacuum conditions.

As an example, commercial high carbon FC20 iron (Fe81.1C13.8Si5.1 in at. %) modified to contain small amounts of Boron have good ductility with very high tensile strength of 3.4 GPa for as-quenched amorphous alloys, and 3.8 GPa for partially-graphitized alloys.

dispersion. Small amounts of dispersion aids may be used if desired. From about 1 to about 5 weight percent, based on the total weight of the aqueous dispersion of silver, nickel or copper acetylide may be dispersed in the aqueous solution, preferably immediately before use.

The aqueous ferrous metal dispersion may be applied in a thin layer on the workpiece at a temperature below the LCST of the dispersion. A design-build scan by the laser beam 104 and associated program-controlled scanner 106 is applied to the thin aqueous layer on the workpiece to raise the temperature above the LCST of the aqueous metal particle dispersion, precipitating ferrous metal particles, metal acetylide, and thermosensitive polymer on the workpiece in the scanned pattern. The deposited metal particles may be further heated to "cure" the deposited build material if the aqueous dispersion is designed for crosslinking and/or reduction reaction. The unprecipitated aqueous dispersion not within the laser-scanned and heated pattern may be removed if desired for such heating. A subsequent thin layer of aqueous dispersion may be applied to the workpiece, which may be the same, or different from the preceding layer. The heating pattern for the subsequent layer of product design may be scanned to heat and precipitate the metal build material in the subsequent pattern, and the process repeated until the green product is completed. Upon completion, the green product may be dried, and sintered in a sintering furnace or HIP apparatus. Alternatively, the scanned pattern of each layer after precipitation and deposition, may be dried and then scanned by laser at high temperature to melt the metal particles to a depth into the workpiece, in accordance with conventional additive laser melt practice. The carbon may be grown or "crystallized" onto the seed carbon nanotubes and/or graphene sheets/nanoribbons at temperatures (eg, say 700 C-900 □C), to grow carbon nanotubes and/or graphene in situ in the laser-fabricated structure. The applied laser power is optimized for example, to melt through and re-solidify one or more previously-deposited layers, which may typically be from about 5 to about 200 μm thick. The composite fabricated products with in situ grown carbon nanotubes and/or

| Commercial FC20 cast iron, plus boron $(Fe_{81.1}C^{13.8}Si_{5.1}Mn_{0.18}P_{0.15}S_{0.02}B_{1.5}$ at %) | Amorphous State | Partially Annealed @710K 30 Min |
|---|---|---|
| Strength | 3500 MPa | 3870 MPa |
| Ductility | Ductile (bending test) | Ductile (bending test) |

With reference to FIG. 1, a powdered, amorphous FC20 high carbon iron with added boron (eg, gas atomized or ground) is uniformly mixed (eg, by ball milling) with 1 weight percent, based on the total weight of the mixture, of short hBN nanotubes, short carbon nanotubes, and/or cBN "seeds" having an individual particle volume of less than about 3 million cubic nanometers. Desirably, the carbon nanotube or hBN nanotube seeds have a length less than about 1000 microns, and more preferably less than about 100 microns. The average distance between the seed particles is desirably less than 50 microns, which facilitates carbon atom diffusion to the seed particles at normal carbon diffusion temperatures. The uniform powder mixture is dispersed in an aqueous solution of from about 1 to about 5 weight percent high molecular weight PVME and/or PNIPA, at a weight percentage in the range of from about 30 percent to about 75 percent, based on the total weight of the aqueous graphene sheets are provided with high composite strength, stiffness, and hardness for structural and protective applications.

When employed in a 3-D manufacturing process with quench-cooling during additive product formation, and post-annealing, this type of alloy is especially useful for producing very strong products which could not easily be formed by thick-section melt-casting, forging or similar conventional processes. The alloy may be substantially fully amorphous upon laser or flashlamp additive product formation, and can be post-tempered after structure or device manufacture. Importantly, with additional "seed" components and thermal processing, 3-D or other structures made by laser/flashlamp fabrication with such high-carbon iron alloys can form in situ composite phases such as graphene sheets and carbon nanotubes in relatively inexpensive material formulations. Carbon is one of the least expensive bulk alloying elements for steels and other iron alloys. At ambient temperatures, the carbon typically forms either hard and brittle iron carbide ($Fe_3C$, "cementite"), or soft and weak graphite in iron based alloys. $Fe_3C$ is very slightly thermodynamically favored over graphite in steel at ambient temperature, but normally converts to iron ("ferrite" and/or "austenite") and dissolved carbon and/or graphite upon heating up toward or through the austenite transition temperature of about 710-750° C. Carbon nanotubes are slightly less thermodynamically favored than graphite at ambient pressure (by roughly the amount of work which it takes to "curl" a hexagonal graphite layer into the small-diameter nanotube).

One method to limit seed dissolution while heating carbon-containing steel alloy mixtures is to maintain a saturated carbon condition in the heated iron mixture. Epsilon (ε) carbide, $Fe_{2-3}C$, can precipitate in plain-carbon steels of carbon content >0.2%, tempered at 100-200° C. but dissolves above ~200° C., where Hagg carbides (monoclinic $Fe_5C_2$) and cementite form. Austenite iron forms above the eutectic temperature of about 730° C., with other steel alloys have other respective, typically higher eutectoid temperatures (eg, ~912 to ~1,394° C.) Austenite is relatively soft and ductile, and can dissolve up to about 2% carbon by mass at higher temperatures, eg 1,146° C. Ferrite steel has very small maximum carbon solubility about 0.02 wt % at 723° C. and 0.005% carbon at 0° C. (32° F.). Above ~723° C. the iron-carbon austenite euctectoid (minimum 0.8 wt % C) dissolves more carbon. Cast irons can be formulated to have high graphite content, rather than $Fe_3C$ by small silicon and BN (hexagonal) addition. Silicon favors graphite formation in iron over $Fe_3C$ formation, and hexagonal plate BN can serve as a nucleation site "seeds" for hexagonal graphite formation to reduce cementite content in cast irons.

As indicated, in some processing embodiments herein, iron supersaturated with carbon is "seeded" with small, short nanotube segments, and these short seed-segments are "grown" in the steel to longer length in the relative absence of competing graphitic "seeds". In accordance with present methods, the short nanotube "seeds" are not fully dissolved in the steel as it is processed, for example by heating to dissolve graphite or convert $Fe_3C$ to an austenite-carbon solution. Boron nitride nanotubes have very similar strength and physical properties to those of carbon nanotubes, and carbon can "grow" on the ends of boron nitride nanotubes. Boron nitride is more stable than graphites and less soluble in steel, so is more stable in nanotube "seed" form in steel, providing a larger working temperature range than carbon nanotube "seeds". Manganese sulfide and $Al_2O_3$ can act as a "seed" for boron nitride. Both MnS and $Al_2O_3$ can form stable nanotubes, on which BN and/or carbon can grow, or precipitate, in nanotube form. They can be dispersed in aqueous ferrous powder suspensions in thermosensitive polymer solutions for use herein. This presents a rich opportunity for control of nucleation sites in high-carbon iron and steel for carbon nanotube and graphene formation.

Acetylides have high enthalpy carbon triple bonded carbon which can rapidly exothermically convert to thin graphene-like structures, with separation of elemental metal therefrom. A mixture of iron or iron alloy (or other metal alloy) particles/powder with acetylides such as silver, copper, nickel, cobalt and/or iron acetylide, when heated under sintering conditions, or flash sintered or flash melted by laser pulse, can form a unified high-strength alloy with reinforcing graphene and/or carbon nanotube reinforcing structure distributed therein. Especially for water-reactive acetylides such as iron acetylide, the mixture of metal particles and metal acetylides can exclude oxygen and moisture during preparation and subsequent processing, such as powder metallurgy processes including HIPping, uniaxial powder compression and sintering, and MIM-sintering.

Figure 2:
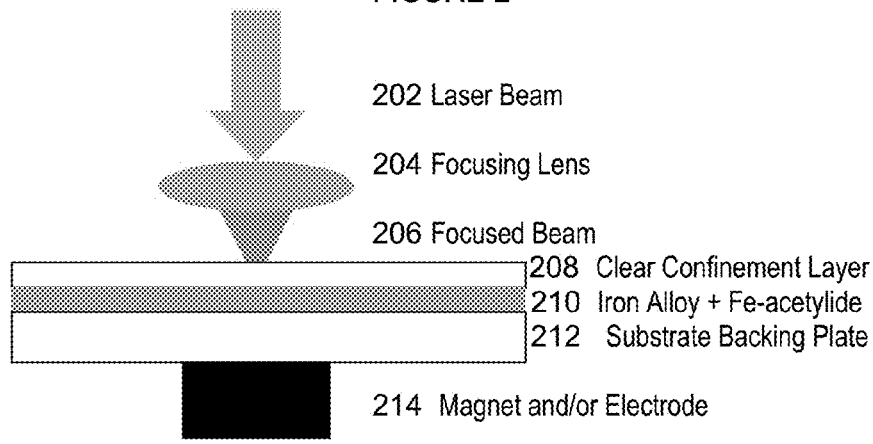
FIG. 2 is a schematic cross-section of a focused beam laser processing apparatus for 3D or other additive processing of materials.

Illustrated in FIG. 2 is a schematic side view of pulsed laser system for processing of ferrous metal powder with acetylide reactants. As shown in FIG. 2, this processing example utilizes system comprises a laser apparatus for providing a laser beam 202, an optional focusing lens 204 for producing a focused beam 206 of reduced cross section for energy concentration if appropriate when using a low-power laser beam, an optional clear confinement layer 208 atop a ferrous metal powder target layer 210 which may be a powdered alloy such as the above-described amorphous Boron-modified FC20 iron alloy which is atomized in inert gas in conventional fast-quench practice. The powdered alloy is lightly and uniformly coated in acetonitrile suspension with 3 weight percent, based on the weight of the powdered alloy, of Iron acetylide FeC2 at a temperature below 70 degrees C. under oxygen and water-free conditions under argon, by bubbling acetylene through an FeC12-containing solution or adding Ca-acetylide to the suspension, such as described herein. The iron acetylide coated iron alloy powder is filter-washed in acetonitrile, applied to a substrate 212 as a thin target layer 210, and inserted in the laser-melting apparatus 200 of FIG. 2, also under oxygen and water-free conditions. The target layer 210 on the substrate backing plate 212 is adjacent a magnet and/or electrode 214 such as a strong Neodymium-Iron-Boron or Samarium-Cobalt permanent magnet. Neodymium-Iron-Boron magnets, eg, nominally tetragonal $Nd_2Fe_{14}B$ (and SmCo) are strong permanent magnets which are readily commercially available with magnetic properties Br up to about 1 to 1.4 Tesla, $H_{ci}$; up to about 750-2000 (kA/m) and $BH_{max}$ up to about 200-440 ($kJ/m^3$). Magnetic flux density B=Magnetic strength H×μ, so through the illustrated glass or quartz substrate backing plate 212 where μ is ~1, the flux density B directed from the upper pole of the magnet 214 through the thin backing plate 212 to the target 210 is substantially equal to the magnetic strength H. In the illustrated embodiment, the backing plate may be transparent glass or quartz having a thickness of about 1 to 3 millimeters, and permanent magnet 214 generates a magnetic vector field perpendicular to its face through the backing plate of at least about 0.1 tesla, and more preferably at least about 0.5 tesla at the target layer 210. The magnetic field can induce a ferrous alloy heated above its Curie temperature, to become magnetically oriented upon cooling below its Curie temperature.

In the illustrated embodiment, a conventional high-powered additive manufacture laser (eg, 500 W to 4 kW) may be used without or with limited focusing for a wider scan swath, or a for a narrower scan swath, short pulse 248 nm KrF Excimer may be used as a pulsed laser power source as described in Qiong Nian et al, "Direct Laser Writing of Nanodiamond Films from Graphite under Ambient Conditions", Scientific Reports, 4: 6612 (2014) and accompanying Supplementary Information at http://www.nature.com/scientificreports, together with related U.S. Pat. No. 8,939,107 issued Jan. 27, 2015 to Yang et al for "Confined pulsed laser deposition method for depositing metastable thin film". The thermal energy applied should be adequate to fully melt the metal particles to form a melted mass. The melted mass can rapidly cool to form an amorphous solid metal alloy.

In an example using a narrow spot-focused 248 nm Excimer pulse to fully melt a scanned small zone of the powdered metal target layer 210, the pulse width of the laser beam may be about 25 ns, and a typical pulse energy of the laser beam may be at least 300 mJ/pulse. The pulse length and energy density applied to the target surface may desirably be selected to fully melt the powdered metal alloy. It is noted that the pulsed beam may apply a pressure pulse of 5 GPa or more to the target metal particles, as a result of the short, intense energy directed at the laser-processed material. The melted metal mass rapidly cools in an amorphous form which can subsequently be heat-treated to grow graphene sheets and/or carbon nanotubes within the metal alloy mass. As illustrated in FIG. 2, the seeded target layer 210 may be processed within a magnetic field and/or an electric field.

In another example, a uniform blend of fine Al4C3, Fe-acetylide FeC2, Ni3C, and Fe powder in a molar ratio of 3:1:1:7 is further uniformly mixed and blended with 1 percent by weight (based on the total weight of the mixture) of single-walled carbon nanotubes having a length of less than about 500 nanometers and 1 percent by weight of graphene ribbons (based on the total weight of the mixture) less than 1 micron in length. 4 grams of the uniformly CNT-graphene-seeded blend is compressed under vacuum and placed in a conventional high pressure high temperature (HPHT) reaction chamber. The reaction chamber is compressed to a pressure of 2 GPa, and then heated to a temperature of 1400 K, held for 10 minutes, then cooled to 1000 K and held for 30 minutes, then cooled to room temperature and finally depressurized. The initiation of the reaction of the Al4C3, Ni3C, Fe and Fe2C assists rapid heating. The reaction mass comprises Iron, Iron Aluminide, Nickel aluminide and an increased mass of carbon nanotubes, graphene and graphite. The example may be repeated with blending of 1 weight percent of 0.25 micron diamond particles instead of graphene and carbon nanotubes, and pressurizing the reaction chamber to 5 GPa. The reaction mass comprises Iron, Iron Aluminide, Nickel aluminide and an increased mass of sp3 diamond carbon.

It is conventionally difficult to 3D or additively print fully conductive metal electrodes and conductors. Some of the problems are caused by gas release under metal, such as silver, reduction or melt conditions. It is also difficult to bond silver nanoparticles NPs and/or nanowires NWs at the low temperatures tolerated by plastics or other sensitive substrates of an additively manufactured product. Thin transparent layers of silver nanowires and graphene are formed by flash decomposition of graphene oxide, but this releases CO2 gas, so is problematic for thicker conductors.

In this regard, approaches to improve conductor formation herein include methods to reduce or slow gas generating reactions, concentrate high temperatures within the metal conductor (eg, silver), not the substrate or surrounding plastic, and to form metal (such as Ag NPs) with another electroconductive material or a lower melting point material convertible to a conductive metal. A reduceable conducting deposit may also be applied to a chemically reducing substrate such as a redox polymer or redox ceramic, and the additive manufacture may be applied in a reducing atmosphere such as hydrogen, ammonia, hydrazine, even triethyl aluminum vapor.

Material Properties

| Material | Melting Point ° C. | Characteristics |
|---|---|---|
| Ag | 962 | NPs "melt" at somewhat lower temp |
| Ag2C2 | 120 | Sensitive to shock or explosive exotherm |
| AgC≡CAg | | (above ~200 C.) The triple carbon bond is significantly exothermic |
| AgCl | 455 | Insoluble in water. Soluble in ammonia-amines |
| AgF | 435 | Soluble in water, not photosensitive to reduction |
| Ag2F | 90 | Reacts with water; made by reacting Ag + AgF Electrically conductive, unstable >70 C. |
| AgI | 558 | Highly photosensitive to reduction |
| AgBr | 432 | Highly photosensitive to reduction |
| Ag2O | 300 | Decomposes 200-280 C. |
| AgNO3 | 209.7 | Produces gas on decomposition |
| AgNO2 | 140 | Produces gas on decomposition |
| Cu2C2 | | Highly exothermic => Cu + C |
| CuC≡CCu | | Limited stability in water at ambient temperature |
| FeC2 acetylide | | Decomposes above 78-250 C. to Fe + C |
| NiC2 acetylide | | Somewhat stable in water at ambient temperature |
| CoC2 acetylide | | Somewhat stable in water at ambient temperature |

Figure 6:
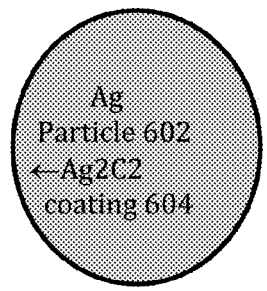
FIG. 6 is a schematic cross-sectional illustration of a silver (or copper) particle having an energetic acetylide coating.

In some aspects of the present disclosure, very thin coatings of highly exothermic silver or copper acetylide, eg, Ag2C2 on the surfaces of (or within) silver nanoparticles and/or nanowires, may be applied to enhance conductivity. AgC≡CAg decomposes with large enthalpy to silver and carbon, Ag+C, without substantial gas evolution (other than possible metal vapor). Copper acetylide similarly decomposes at elevated temperature into copper and carbon. Ag (Cu, and other elements) can dope graphene to increase conductivity. A solid silver (copper)/graphene/graphite composite can form a stable conductor. Ag2C2 is easily prepared, for example by bubbling acetylene in and aqueous silver nitrate solution at ambient temperature to form a precipitate which can be stored in the dark in wet form. Ag can also be deposited on Ag2C2 and other acetylides. Ag nanoparticles are also easy to prepare in aqueous solution (eg, see Skylar-Scott et al, below). Ag2C2 is stable in water. But when neat and dry, with thermal or other triggering, $Ag_2C_2$ and other metal acetylides can rapidly decompose to polymerize the acetylide and release the metal with large heat output. A thin acetylide coating diluted by mass and geometrical separation on Ag or other nanoparticles or nanowires can limit and control sensitivity and deflagration, while applying local thermal energy and releasing hot silver (or other metal) and electrically-conductive graphitic carbon directly at the interfaces of the particles/wires to be joined. Reducing mass enthalpy density in a reaction mass, and geometrically segregating deflagration, can enhance solid reaction product formation. In this regard, illustrated in FIG. 3 is a schematic flow diagram of additive manufacture of a silver conductor from silver nanoparticles or nanowires which are coated with a thin layer of silver acetylide by reaction with acetylene in aqueous suspension. The silver nanoparticles/nanowires can be in a dilute solution of a silver salt such as silver nitrate, or may react directly with acetylene dissolved in the aqueous suspension to form silver particles 602 with a silver acetylide coating 604 (FIG. 6). The silver acetylide nanoparticles/nanowires are applied to a substrate, laser heated to with added exothermic surface from the localized exothermic silver acetylide decomposition energy and released Ag to form a laser welded nanoparticle or nanowire network with interconnected electrically conductive graphene network. Nanosilicon particles, such as may be made in accordance with applicant's U.S. Pat. No. 9,765,271 issued Sep. 19, 2017, preferably made with a small amount of Li and a conductor such as TiSi, are coated with an acetylide such as Cu or Ag acetylide, and coated on a thin copper battery electrode of a Li—Si battery system. The coating is then heated to separate conductive metal and form a porous graphene enveloping network coating matrix around the Si particles. The Si particles may have monomolecular precoat of crosslinked polyhydroxy material such as PVOH, and small amounts of a nitrile or other N-doping component may be included in the mixture prior to reactively dissociating the acetylide(s) to N-dope the graphene-graphite formed thereby. The heating may be in an oven, flashlamp, and/or by laser scanning. The porous graphite-graphene coating facilitates cyclic stability of Li charge-discharge cycles in the Silicon particles, when in a rechargeable Li battery system. In another example, a thin, continuous layer of Ag, Cu and/or lithium acetylide may be applied over a thin sheet or film of lithium. The lithium film may be plated or applied on a thin copper sheet or film which is a battery electrode. The acetylide layer may be applied by reaction of acetylene with the lithium film or small amounts of Cu and/or AG on the lithium film, by metathesis reaction and/or by application of a nanoscale slurry of Ag2C2, Cu2C2 and/or Li2C2 onto the lithium film. The acetylide(s) layer on the lithium film is decomposed by application of flashlamp (eg, via apparatus like that of Applicant's U.S. Pat. Nos. 5,514,885 and 5,629,532), scanned laser energy (eg, via apparatus like that of FIG. 2), or reduction with a reducing agent such as SnI4. Ag, Cu, Li acetylide(s) may also be deposited from solution, such as by applying monolithium acetylide (prepared by treating a THF solution of Acetylene with n-Butyllithium at −78° C., and raising the temperature to deposit Li2C2. The heat-induced decomposition of Ag2C2, Cu2C2 with reduction of Li2C2 forms a dendrite-preventing nanoporous graphene-carbon barrier in recharging battery configuration. The nanoporous carbon film serves as a barrier to lithium spike short growth in the lithium battery.

Figure 4:
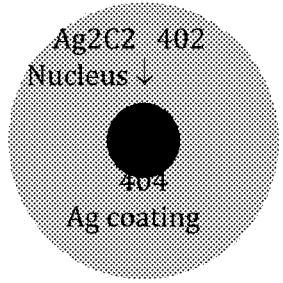
FIG. 4 is a schematic cross-sectional illustration of a silver (or copper) particle having an energetic acetylide core.
Figure 5:
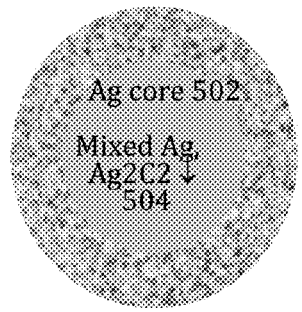
FIG. 5 is a schematic cross-sectional illustration of a silver (or copper) particle having a mixed silver (or copper) metal and energetic acetylide coating.
Figure 7:
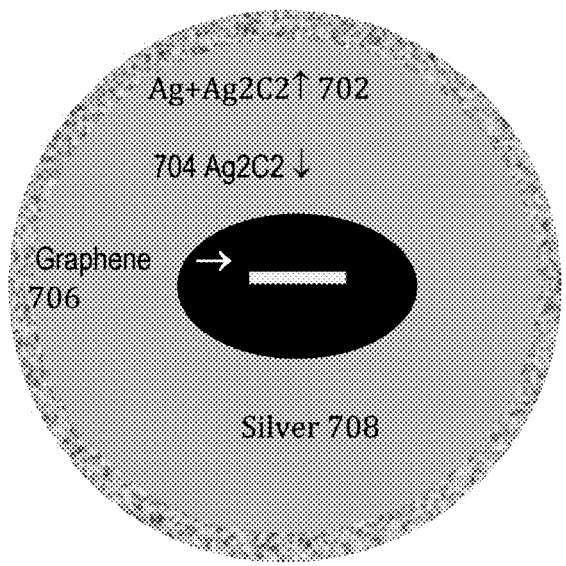
FIG. 7 is a schematic cross-sectional illustration of a silver (or copper) particle having a graphene nucleus, an energetic acetylide core with the graphene nucleus, a silver (or copper) body, and a mixed silver (or copper) metal and energetic acetylide coating.

Silver nanoparticle and Ag2C2 precipitates are conventionally made in aqueous suspension, although other solvents may be used. Ag2C2 nuclei or coatings can be made by bubbling acetylene for a short time through an aqueous suspension of silver nanoparticles or wires, as described herein. Similarly, Ag2C2 nanoparticles can be formed as nuclei in aqueous suspension with acetylene, then coated with silver by omission of acetylene under silver reducing conditions. Coating Cu2C2 with silver (or Cu) is a good design for Cu2C2 systems (eg, FIGS. 4, 7) because Cu2C2 is sensitive over time to water. By coating Cu2C2 particles with Cu, or Ag, the CuC2 acetylide can be used in water suspension. Graphene "seeds" can also be useful. In addition, Ag and Ag2C2 can be codeposited together into co-precipitates by controlling the addition of acetylene during silver reduction. For example, forming Ag nuclei, followed by small amounts of acetylene introduced during subsequent silver reduction on the nuclei. FIGS. 4, 5, 6 and 7 illustrate schematic cross-sectional examples of types of metal and acetylide particles (eg, nanoparticles and/or nanowires) which may be made and used herein. FIG. 4 illustrates composite particles comprising a silver acetylide nucleus 404 with a metallic silver coating 402 surrounding the nucleus. The particles of FIG. 4 may be made by nucleating silver acetylide in an aqueous silver salt solution with a limited amount of acetylene, followed by further reduction of silver salt reduction in the absence of acetylene. FIG. 5 illustrates composite silver particles comprising a silver core 502, surrounded by a mixed silver, silver acetylide coating 504. Particles of the type illustrated in FIG. 5 may be manufactured by initially nucleating silver particles by reducing a silver salt in aqueous solution, followed by continuing the reduction reaction of the silver salt, while providing a limited amount of acetylene to co-precipitate silver acetylide with the co-precipitating silver metal. Broad ranges of co-precipitation ratios, such as 1:20 to 20:1 molar Ag:AgC2 ratios, may be carried out by control of the acetylene concentration and the silver metal reduction reaction rate. FIG. 6 illustrates a silver particle 602 with a silver acetylide coating, which may be made by reversing process steps of FIG. 4 particle manufacture. The composite particle of FIG. 7 is a more comple exothermic "seed" particle comprising a central graphene nanoribbon or CNT seed 706, a core exothermic nucleus of silver acetylides 704 surrounding the graphene sheet 704, a silver metal body 708 surrounding the exothermic acetylide 704, and a mixed silver, silver acetylide coating surrounding the silver body 708. The particles of FIG. 7 have both localized internal heat-generation properties, as well as external heat generating capacity for localized particle welding. An internal graphene sheet can "seed" conductive graphene formation. Such particles may be made by suspending graphene sheets and a silver salt in aqueous solution, precipitating silver acetylide on the graphene nuclei, silver on the acetylide, and mixed silver, silver acetylide over the silver body. Copper acetylides may also be used. Each particle of FIG. 7 is a miniature graphene/CNT seeded heat generator.

Figure 8:
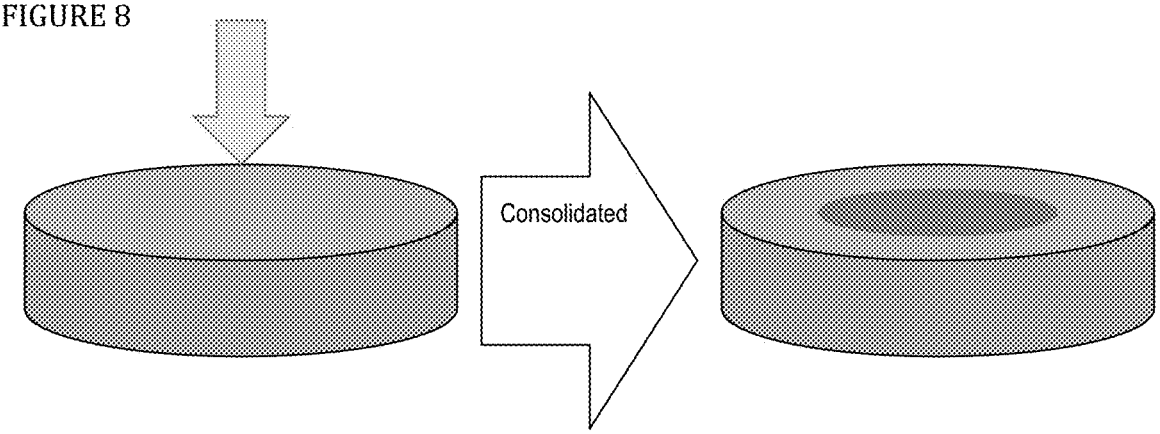
FIG. 8 is an illustration of a disc-compressed energetic est sample, for laser test processing.

As indicated, the highly exothermic silver and copper acetylides can provide localized thermal heating. In an example such as illustrated in FIGS. 8, Ag and Ag2C2 particles, and/or particles such as illustrated in FIGS. 4-7, can be compressed into a dense disc and dried, or applied as a aqueous or other slurry to a suitable substrate and dried. The exothermic Ag2C2 can be "triggered" by laser or flash lamp pulse, to decompose with little or no vapor product. The laser triggering can be carried out in an inert atmosphere, a reducing atmosphere (eg, H2 or NH3) or in a vacuum to reduce heating any gas present in the particle mix. The final temperature at the reaction zone can be controlled, by the amount of addition of laser pulse energy to the exotherm reaction energy of the acetylide, both of which can be of short duration compared to thermal conduction rates, to protect adjacent thermally sensitive materials or build components. The composite Ag+Ag2C2 materials may be applied as electrode or electrical conductor printing inks, in a manner like that conventional silver (or copper/alloy) inks which produce residual porosity adversely reducing electrical conductivity.

As another example, a suspension (which may include small amounts of graphene or carbon nanotube "seeds") may be applied to a substrate, dried and laser scanned to apply a 130° C. temperature to "melt" the particles together at the 120 C Ag2C2 melting point, where they touch, without substantial reaction. A second pass at higher laser or flash-lamp intensity can be applied to heat to a localized melting or sintering temperature, to decompose the silver acetylide to new silver and carbon in the form of electrically conductive graphene or graphite, and to produce an interconnected network of silver particles or wires with an interconnected conductive graphene network, without thermal damage outside the silver conductor or electrode formed. The processing, timing, energy levels, will vary depending on the ratio of exothermic material to inert or endothermic materials, the types and composition of the components, and the conductor desired.

Graphene-Copper composites made from GO, PVOH and copper particles can have good properties, despite some vaporization. Cu2C2+Cu+Ag+Ag2C2 can produce thicker, more uniform composites. There are a variety of stabilization approaches for storage stabilization of aqueous suspensions of metal and metal acetylide particles. Aqueous solutions of thermosensitive polymers such as PNIPA or PVME can stabilize the suspensions as well as facilitate deposition. The dispersions may be made in such aqueous solutions of thermosensitive polymers. A wide variety of sensors, transparent and nontransparent electrodes and other devices are can be fabricated therefrom.

The self-heating, no-gas reaction particle approach can also be used in direct laser-melted fabrication instead of conventional pure silver 3-D printing or extrusion inks, such as described at by Skylar-Scott et al, "Laser-assisted direct ink writing of planar and 3D metal architectures", (2016) PNAS vol. 113, no. 22, pp. 6137-6142 for 3-D silver printing. For example, a silver nanoparticle slurry may be synthesized in a process similar to that conventionally used for laser sintering. In this regard, 0.9 grams of a 25% (wt/v) solution of 50 kDa poly(acrylic acid) in water and 1.8 g of a 50% (wt/v) solution of 5 kDa poly(acrylic acid) are dissolved into 50 g of distilled water in a 500-mL Erlenmeyer flask. Forty grams of diethanolamine reducing agent is then added, with stirring at ambient temperature. 20 grams of silver nitrate is then dissolved in 20 grams of distilled water in a separate container at ambient temperature, to form a solution which is added and blended with stirring to the ethanol-poly(acrylic acid) solution. The blended solution turns from colorless to a clear, pale brown color as silver nanoparticles are nucleated and precipitate. After 24 hours the temperature of the blended reaction mixture is increased to 75° C. for 2 hours, the solution is cooled to room temperature, and then 300 mL of ethanol is rapidly added with stirring to precipitate the suspended silver nanoparticles. The precipitated silver nanoparticles are settled under quiescent conditions, the supernatant is decanted away, and the silver nanoparticle sediment is transferred into a separate 50-mL conical tube without drying. The nanoparticles are then centrifuged at ~13,000 g for 20 min into a dense pellet, and the supernatant is discarded. The nanoparticles are again suspended by vigorous vortexing in 15 mL of water, filtered through a 5-μm syringe filter, washed with 35 mL of ethanol, and centrifuged again at 13,000 g for 20 minutes to form a pellet, while discarding the supernatant. The cleaned silver nanoparticle pellet is then mixed in 1:1 weight ratio with a 20 weight percent aqueous solution of PVME, transferred via spatula into a 3-mL syringe (Nordson EFD) and centrifuged for 10 min at 4,000 g to remove trapped air. The syringe is then placed into an HP3 high-pressure dispensing adaptor (Nordson EFD), connected to a variable pressure supply (Nordson EFD), and a 2-inch-long glass nozzle with either a 10- or 1-μm inner diameter is added to the syringe (World Precision Instruments). The syringe and high-pressure adaptor are used to extrude the dense aqueous silver nanoparticle suspension in PNIPA/PVME solution, which can be extruded and coagulated in self-sustaining form at relatively low temperature with minimal heat transfer back to the extrusion nozzle, permitting better and more flexible laser sintering control farther away from the extrusion nozzle.

Silver halides melt at a lower temperature than silver metal. Silver nanoparticles can be mixed consolidated and/or extruded at the respective silver halide melt temperature, then cooled and reduced, for example by aqueous Tollens type reagent reducing solution, or reducing atmosphere (eg NH3 and/or formic acid) applied locally or to the whole extruded structure. The deposited silver converted from the halide matrix can unify the silver particles.

For example, an aqueous suspension of silver nanoparticles with silver bromide nanoparticles (or silver nanoparticles with a silver bromide coating) can be prepared. It can be in a thermosensotive polymern suspension. It is dried and pressed into a solid test disc, or applied to a suitable substrate and dried. The dried mixture can be at melted at 450° C. in an oven or consolidated with an IR laser (to limit photosensitive reduction). VIS/UV light can then be applied in an ammonia atmosphere to reduce the silver bromide and emit Br2 from the surface without inducing porosity. Alternatively, the consolidated structure can be treated with Tollens reagent or another reducing solution. A similar example uses AgF, first converting it to Ag2F in admixture with Ag after drying, which has a 90 C melting point. UV light facilitates reduction. In this regard, A mixture of Ag nanoparticles with for example 1-10 weight percent Ag2F by weight based on the total Ag+Ag2F may be forced under pressure at a temperature below the Ag2F melting point (eg, less than 70 degrees C.) and extruded through a nozzle under pressure in additive manufacture application to a substrate, with concomitant heating to a temperature over the melting point of Ag2F (for example, a temperature in the range of from about 91 to about 150 degrees C.). Upon melting, the composite Ag2F and nanoparticle silver mixture consolidates. Upon heating, the Ag2F releases silver which increases electroconductive connection and joining of the silver nanoparticles, and forms higher-melting AgF, 2 Ag2F=>Ag+AgF. Ag2F itself has a reasonable electrical conductivity. Heating of the extrusion mass at the extrusion nozzle may be carried out by heating the nozzle, providing a heated substrate upon which the mixture is extruded, and/or applying electromagnetic heating such as laser beam heating. The Ag2F may be prepared in accordance with conventional practice, or may be coated on the silver nanoparticles, flakes or wires by reaction with AgF, or by electrochemicl deposition onto the conductive particles. The consolidated mass may be further processed by reduction of the remaining AgF by reducing solution, atmosphere and/or reducing substrate or coextrudate as described herein.

Another method to reduce applied silver salt components to produce a conductive silver trace or electrode it to apply the silver salt and silver nanoparticle dispersion to a chemically reducing substrate. For example, TiO2 coatings on a substrate can be reduced on its surface to $Ti^{3+}$ in a reducing hydrogen atmosphere or other reducing environment. TiO2 layers are strong and easy to apply. This can be done to the entire surface, or a scanned surface area (eg, scan a pattern with a heating laser in an H2 atmosphere, or with a reducing solution layer). A silver salt or salt-nanoparticle dispersion can be applied to the surface, where it will "plate" in the reduced pattern. Similarly, a suspension of Ag nanoparticles in PVME or PNIPA [Poly N-isopropylacrylamide] solution can be precipitated or extruded onto the surface for reduction thereon. There are redox-capable structural polymers as well, which can be used for this purpose.

Laser scanned SLA and DLP vat polymerization processes apply localized irradiation to polymerize a light sensitive resin contained in a vat, in x, y planes, as the build platform moves through the resin along the z-axis. This can produce detailed 3-D structures, but the resins and monomers are difficult to work with and toxic. Water-based fluids, without volatile reactive or toxic monomers, can make 3-D manufacturing of plastics, metals and ceramics easier and safer, especially for consumer, school, university and small business users where safety is important. As discussed, an important component of various aspects of the present disclosure is a thermosensitive aqueous solution which has a lower critical solution temperature, LCST. When heated in water above its LCST the thermosensitive polymer undergoes a solubility phase transition from a soluble hydrated state to a non-soluble dehydrated state. For example, polyvinyl methyl ether dissolves in water below about 33° C. It precipitates at temperatures over about 34 C, as a result of reduced hydrogen bonding of the ether groups at the more elevated temperature. Poly(N-isopropylacrylamide) is a temperature-responsive polymer which is readily prepared by free-radical polymerization of N-isopropylacrylamide as monomer (and comonomer). Similarly, PNIPA dissolves (or if very lightly crosslinked, swells) in water below about 32° C. (90° F.), and precipitates above this temperature. When heated from a lower temperature in water solution to a temperature above about 32° C. (its lower critical solution temperature, LCST) for the homopolymer, it changes phase to precipitate from aqueous solution. The phase change is reversible, so that the polymer can swell and/or redissolve in water at temperatures below its LCST. N-isopropylacrylamide can be copolymerized with other monomers to change the LCST of the resulting copolymer, and/or to add cross-linking agents or other functionality. For example, copolymerization with a glycidyl-ether containing vinyl monomer such as glycidyl methacrylate can add crosslinking capability with its amide functionality or with slurry components of the phase change build fluid. Aqueous PVME solutions been used for decades to make balloons and coatings from aqueous emulsions of rubber. A balloon form heated over 34° C. is inserted into an aqueous rubber emulsion which contains dissolved PVME. When the emulsion next to the mold gets over about 34° C., the PVME comes out of solution at the heated surface and locally breaks the emulsion (its ether groups reduce their water hydroxyl interaction), destabilizing and taking the emulsified elastomer with it to coat the heated form. The broken emulsion does not "re-dissolve" if cooled if the surfactant-emulsifier structure is destroyed. The mold is removed, dried, and cured to produce a latex balloon or other product.

Aqueous thermally sensitive polymer solutions such as Poly(N-isopropylacrylamide), PNIPA, and poly(vinylmethylether), PVME, solutions can form a wide variety of emulsions and suspensions, which can be locally heated at or adjacent a substrate to precipitate additive layers. The emulsified/suspended materials can be plastics, metals, and/or ceramics. They can be reactive to crosslink, and can have surface treatments to form reinforcement and covalent bonding in the 3-D structure. Examples, such as those above and the following, can include: Emulsified epoxy resins and epoxy curing agents, with ceramic reinforcements, Graphene and/or carbon nanotube particles (with or without covalent-bonding moieties and matrix components), biocompatible materials such as hydroxapatite Ca10(PO4)6 (OH)2] and collagen fibers with growth factors for bone, and poly lacticacid esters for other implants, semiconductors of many kinds, organic and inorganic, formed in layers to make devices, LEDs, etc., silver traces and electrodes (from AgZO, AgBr, AgF, Ag nanoparticles), fusible metal powders, wide ranges of other materials, such as cement (tricalcium silicate) and slag particles (dicalcium silicate), clay (montmorillonite, atapagulite), polymer mixtures, self-assembly components, Si—SiO2 mixtures (for SiO2-coated Si deposition), Ag—Ag2O mixtures for silver traces, self-assembly components and base materials, functionalized medical or sensor ceramics, Alumina-doped Zinc Oxide (AZO) and other VIS-transmissive conductors, organic LED components, silicone resins and the like.

Emulsions and suspensions (with low degree of, or metastable surfactant stabilization) can be relatively transparent to various laser wavelengths, if the refractive index of the aqueous PVME or other thermosensitive polymer solution matches that of the suspended phase, or if the suspended phase is well below the laser wavelength in size. The particle size can be significantly bigger with infrared lasers, because of their longer wavelength (eg, ~10 microns for CO2 laser, or about 20 times the He—Ne VIS laser). For the most detailed fabrication, the liquid suspension can be relatively transparent compared to the substrate absorption, so the scanned laser heats the substrate, not just the liquid emulsion along the laser or flashlamp light path to the substrate. The aqueous suspension can be colored or absorbing, especially when the top layer of fluid is thin (or the distance to the bottom window is small for inverted vats. The aqueous suspension can have absorption band(s) which can be selected or avoided by laser light used for processing herein. It is noted that an additional processing degree of freedom, is that the thickness of the scanned or DLP deposit can be varied in some processes by the amount of heat applied, by programmed intensity variation or scanning time variation.

For mechanism illustration, a rubber latex, aqueous free-radical artificial rubber, or ABS (acrylonitrile-butadiene-styrene) polymerization emulsion in a PVME or PNIPA solution can be used for 3D printing. A conventional microemulsion latex with polymer particles less than 50 nm can be optically clear in the VIS range, with added high molecular weight PVME or PNIPA, say at 2-4 percent by weight. The aqueous emulsion can be applied in a thin layer (eg, 1 mm) to a substrate. A laser pattern can be scanned in a predetermined pattern on the thin aqueous layer sufficient to raise the temperature of the substrate pattern to 50 degrees C. or more. The remaining aqueous emulsion can be washed off with water to view the deposited pattern.

A similar mechanism illustration can be carried out with silicon powder: 1.Form a suspension of nano and-or P-type silicon in aqueous (hyper-pure) water with PVME. 2. Coat the fluid layer on an N-(opposite) type monocrystalline silicon wafer. 3. Apply IR light-scan pulse heating to a scan temperature of 50 degrees Celsius to precipitate silicon particles in the scanned traces on the N-type silicon wafer. 4. Remove the non-condensed fluid. 5. Dry the condensed traces. 6. Pulse-melt the coated areas in argon or vacuum with a laser, and flash cool to re-crystallize the puse-melted silicon. A p-type trace is formed on the n-type wafer. 7. Repeat with additional layers to make diodes, solar photovoltaics, transistors and the like in 3-D or 2-D structures. 8. Apply metal electrodes, such as silver, gold, copper.

A similar mechanism illustration can be carried out with a reactive polymer system: 1. separately nano-emulsify epoxy resin and/or amine curing agent with surfactant. Blend reactive amino-silane coated silica particles (and/or glycidyl ether silane-coated silica particles) with the emulsified epoxy or amino resin in a PNIPA or PVME aqueous solution. 2. Apply a thin layer of the dispersion on a dark substrate, laser pattern the layer to a temperature above the LCST to precipitate the blended components, wash off excess fluid. The traces may be cured at an elevated curing temperature.

A mechanism illustration of silver additive deposition can be carried out: 1. Prepare an aqueous suspension of "emulsified" silver oxide and silver nanoparticles in PVME solution. 2. Laser scan a pattern above LCST temperature to precipitate the particles, wash off undeposited suspension, dry. 3. Heat the pattern to create a Ag trace and CO2 gas from PVME and optional surfactant, or 4. Apply a Tollens Reagent or reducing liquid or vapor (eg, NH3) to reduce the AgO and plate a fully continuous silver trace.

Figure 9:
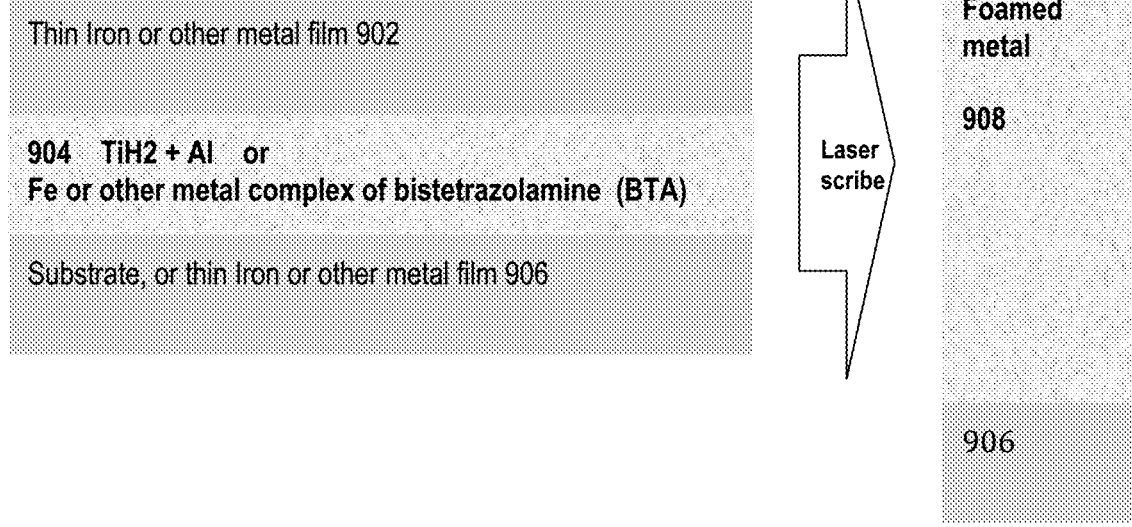
FIG. 9 is a schematic cross-sectional illustration of a test sample for demonstrating metal foaming in additive manufacture.
Figure 10:
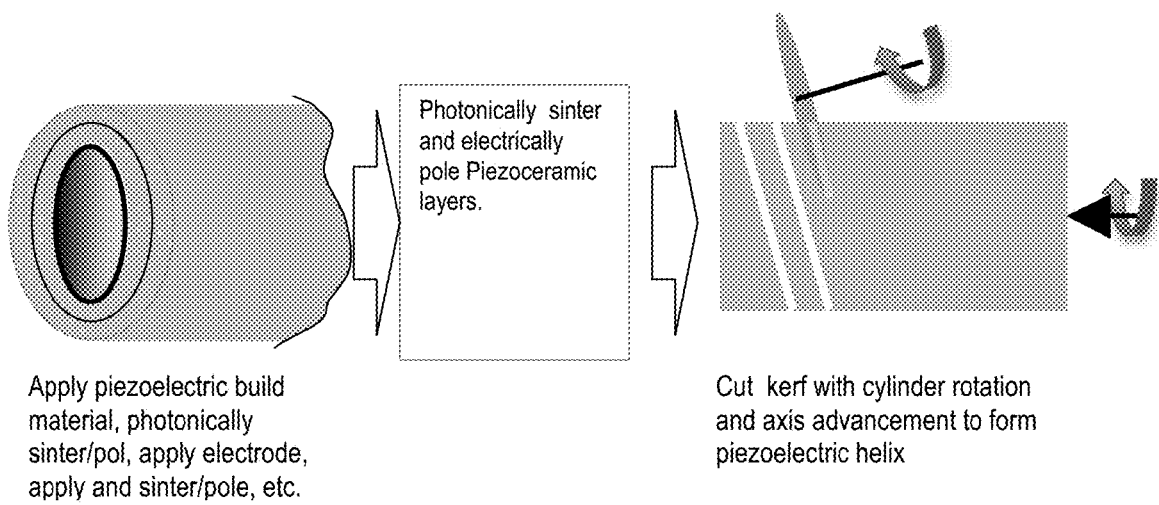
FIG. 10 is a schematic illustration of additive manufacture of a piezoelectric and/or giant magnetostrain helical bender actuator device.
Figure 11:
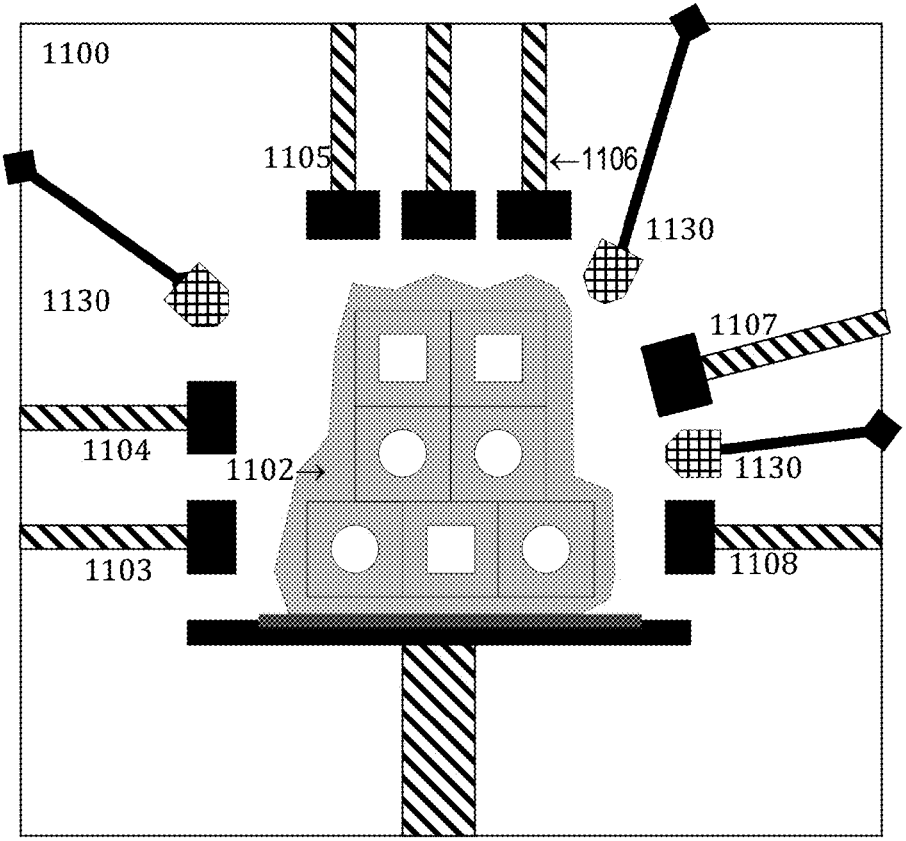
FIG. 11 is a schematic cross-sectional illustration of an additive manufacture machine for thermosensitive build systems and generic block pre-assembly for combining benefits of conventional (eg, MIMs) product manufacture and additive manufacture.

It is also useful to 3-D form foamed volumes in 3-D structures, for metal, plastics, ceramic products and structures. For additive manufactured metal objects, products can be foamed by gas generation in a heat-softened or melted metal structure. Metal and metal alloy hydrides such as titanium hydrides, graphene oxides, and nitrogen-based gas generating agents are good sources for gas evolution. An exothermic mechanism illustration for 3-D Laser-scanned metal foams (FIG. 9): TiAl Metal foam Thoroughly mix TiH2 and Al powder, and roll the powder in a roll mill between 2 thin Fe foils. Alternatively, roll TiH2 powder in between 2 Al foils or a thin Al screen, and place, or roll between 2 thin Fe foils; laser scan a pattern on the rolled Fe foil layers, to raise the internal temperature of the layers above 400-500 C to form AlTi and release H2 to form a raised Al+AlTi foam in the scanned pattern. Alternatively cut the rolled Fe foil layers into thin strips, and cross scan a pattern across the strips.

Mechanism illustration for additive manufacture of foamed iron: Apply an iron complex of bistetraazoleamine between 2 iron or other metal foil sheets. The Fe—BTA complex may be "diluted" with Fe, Al and/or other very fine (preferably <5 micron) metal or ceramic powder to control the reaction rate and limit self-combustion outside the scanned patterns. Al will increase the enthalpy by forming AlN and Fe—Al. Fe particles will provide centers for Fe growth and increase the foam density. The amount of Fe-BTA complex should be limited to control structure formation, rather than uncontrolled vaporization. Laser scan a pattern on the rolled Fe or other metal foil layers, to raise the internal temperature of the layers above 800 C to form a raised Fe foam in the scanned pattern. Alternatively cut the rolled Fe foil layers into thin strips, and cross scan a pattern across the strips. Or, apply a thin layer of Fe-BTA with added Al or Fe powder, on top of a metal substrate, without a top layer. Laser scan in an inert atmosphere, to create a pattern of metal foam. Remove the unfoamed Fe-BTA which was not scanned. Apply a 3-D layer of another material (plastic or metal) on top of the foamed metal zones.

An example of a foaming method for additive manufacture of plastic products: Form a layer of thermoplastic with a blowing agent between layers of plastic without a blowing agent. The blowing agent can be a conventional gas-generating blowing agent for plastics, or an incidental gas-generating material such as graphene oxide which converts to graphene and carbon dioxide upon application of appropriate light pulse. Laser scan to warm and soften the top layer, and melt or soften the middle layer with release or activation of the blowing agent to produce a gas. Additional 3D printing may be applied on top of the foamed layer(s) to produce an encapsulated foamed zone in the 3D printed product. Or, apply a plastic with a blowing agent directly with a laser scan in a 3-D pattern. Apply a patterned layer atop the foamed plastic pattern after it is laser-foamed. Or, apply an aqueous-emulsified/dispersed plastic with a foaming agent using PVME or other thermosensitive dispersion(s), by >LCST thermal deposition. Re-scan (eg, without the aqueous PVME suspension/emulsion) with higher thermal intensity to foam, or apply another layer of thermoplastic, then heat the applied layer and the gas-generating foaming agent-containing layer in a scanned pattern to produce a raised, foamed 3D pattern.

As another example, commercial high carbon FC20 iron (Fe81.1C13.8Si5.1, in atomic percent %) modified to contain small amounts of Boron have good ductility with very high tensile strength of 3.4 GPa for as-quenched amorphous alloys, and 3.8 GPa for partially-graphitized alloys. This is significantly higher than AISI 4340 @1.9 GPa and Aermet100 @ 2 GPa maraging steels.

An inexpensive, powdered, amorphous FC20 high carbon iron with added boron, mixed with hBN and/or carbon nanotube "seeds" and/or diamond and/or cBN "seeds" may be laser-fabricated and flash-cooled into sheets or other programmed 2-D or 3-D structures, and the carbon "crystallized" into carbon nanotubes and/or diamond at crystallization temperatures (eg, say 700C-900□C, to grow carbon nanotubes and/or diamond in situ in the laser-fabricated structure. The composite fabricated products may be provided with high composite strength, stiffness, and hardness for structural and protective applications at reasonable cost. The additive manufacturing chamber may be enclosed for atmospheric control or vacuum conditions. In respect of FIG. 2, the applied laser power is optimized for example, to melt through and re-solidify one or more previously-deposited layers, which may typically be from about 5 to about 200 μm thick. $Fe_{75}CoNiSi_8B_{17}$ glassy alloys can have a Young's modulus of 110 GPa, compressive fracture strength of 2800 MPa and fracture elongation of 1.9%, with a supercooled liquid region of over 50° C. FC20-Boron and such other alloys can be gas or disk atomized above their melting temperatures Tx, and flash-cooled (below Tg) in inert gas or splat-cooled on a cold surface to particle sizes appropriate for additive processing. Particle sizes are desirably selected in the range of from about 5 to about 50 microns in largest dimension (diameter for preferred spherical particles). Amorphous ribbons or wire can also be manufactured from amorphous alloys by impingement of a molten stream (above Tx) onto a cold surface in accordance with conventional practice, for use in additive electropulse and/or pulsed-light 3-D manufacture. It is noted that the additive powder should best be of proper stoichiometry and substantially homogenous, but need not be in amorphous form, because the alloy component powder, wire or ribbon is melted in the additive manufacture processing.

A laser system or pulsed flashlamp production system does not require high glass-stability BMGs for manufacture of large and/or geometrically complicated structures. Amorphous structures can be manufactured using less glass-stable alloys with less expensive or less complicated compositions. Very inexpensive, extremely strong (over 3500 MPa) amorphous iron alloys are exceptionally useful in this regard. The composition of one amorphous iron alloy described by amorphous alloy metals pioneer A. Inoue is similar to inexpensive, high carbon, ductile FC20 but relatively weak cast iron, plus a small amount (~1.5 at %) of Boron. This amorphous iron alloy exhibits extraordinary mechanical properties, such as high strength and good ductility in amorphous, and partially crystallized forms:

| Commercial FC20 cast iron, plus boron ($Fe_{81.1}C_{13.8}Si_{5.1}Mn_{0.18}P_{0.15}S_{0.02}B_{1.5}$ at %) | Amorphous State | Partially Annealed @710K 30 Min |
|---|---|---|
| Strength | 3500 MPa | 3870 MPa |
| Ductility | Ductile (bending test) | Ductile (bending test) |

When employed in a 3-D manufacturing process with quench-cooling during additive product formation, and post-annealing, this type of alloy is especially useful for producing very strong products which could not easily be formed by thick-section melt-casting, forging or similar conventional processes. Products manufactured can approach or exceed the strength properties of products made with expensive maraging steels as described herein. The alloy may be substantially fully amorphous upon laser or flashlamp additive product formation, and can be post-tempered after structure or device manufacture. Importantly, with additional "seed" components and thermal processing, 3-D or other structures made by laser/flashlamp fabrication with such high-carbon iron alloys can form in situ composite phases such as graphene, carbon nanotubes, diamond and/or DLC as described in more detail hereinbelow.

New types of products which benefit from fabrication using 3-D additive and/or closely confined pulsed light include products, devices and components fabricated from ultra-hard boron-based materials such as $AlMgB_{14}$ and its alloys (eg, with $TiB_2$) which have extreme hardness characteristics, as additive build material dispersions on aqueous thermosensitive polymer solution. Unique 3D structures with extreme properties can be made from laser-additive processing of this material, which is otherwise difficult to process. Fast-cooling of added mass produces a nanocrystalline state, which can be annealed to larger crystalline size if desired by subsequent thermal treatment of the fabricated product. In addition to 3-D products using pulsed laser or patterned flashlamp additive heating, surfaces with applied $AlMgB_{14}$ patterns, or coated machine tools may also be manufactured as described herein.

Carbon is one of the least expensive bulk alloying elements for steels and other iron alloys. At ambient temperatures, the carbon forms either hard and brittle iron carbide ($Fe_3C$, "cementite"), or soft and weak graphite in iron based alloys. $Fe_3C$ is very slightly thermodynamically favored over graphite in steel at ambient temperature, but normally converts to iron ("ferrite" and/or "austenite") and dissolved carbon and/or graphite upon heating up toward or through the austenite transition temperature of about 720-730° C.

Reinforcing steel with ultrastrong carbon nanotubes instead of brittle iron carbide or weak forms of graphite produces an extremely strong composite. Carbon nanotubes and graphene are extremely strong. Tensile strengths of multiwall carbon nanotubes ("MWNT") have been measured at up to 150 GPa. By the rule of mixtures, a low-alloy steel with 4% carbon nanotubes having a strength of ~100 GPa has a nominal composite strength >4 GPa (>600Ksi), exceeding that of maraging steels such as AISI 4340 (~1.9 GPa) and Aermet100 (~2 GPa). Carbon nanotubes are already used commercially to reinforce soft metals such as aluminum, magnesium and copper, by rolling, thermal spray and powder compression procedures. While carbon nanotubes can be incorporated in steel by powder and/or roll bonding (eg, "ARB") processes, refined carbon nanotube raw materials are still very expensive. In accordance with the present disclosure, carbon nanotubes are "grown" in the steel from inexpensive carbon. Carbon nanotubes are slightly less thermodynamically favored than graphite at ambient pressure (by roughly the amount of work which it takes to "curl" a hexagonal graphite layer into the small-diameter nanotube). Accordingly, graphite normally forms in steel, instead of carbon nanotubes.

In conventional methods to make carbon nanotubes, the thermodynamic preference to form graphite is overcome by using very small catalyst particles of nanoscale diameter (typically iron group elements) which nucleate nanotube growth in the vapor phase, under conditions which kinetically limit graphite nucleation and growth. Temperatures above about 700-1100° C. typically used for nanotube growth from the vapor phase, include the austenite transition temperature range at which carbon dissolved in iron, precipitates out as $Fe_3C$ in steel. Epsilon ($\varepsilon$) carbide, $Fe_{2-3}C$, can also precipitate in plain-carbon steels of carbon content >0.2%, tempered at 100-200° C. but dissolves above ~200° C., where Hagg carbides (monoclinic $Fe_5C_2$) and cementite form. Austenite iron forms above the eutectic temperature of about 730° C., with other steel alloys having other respective, typically higher eutectoid temperatures (eg, ~912 to ~1,394° C.). Austenite is relatively soft and ductile, and can dissolve up to about 2% carbon by mass at higher temperatures, eg 1,146° C.

Conventional carbon steel with up to about 0.2 wt % carbon is primarily ferrite (alpha iron having a BCC crystal structure), with increasing amounts of perlite (a lamellar structure of cementite and ferrite) with increasing carbon content. Ferrite has very small maximum carbon solubility about 0.02 wt % at 723° C. and 0.005% carbon at 0° C. (32° F.). Above ~723° C. the iron-carbon austenite euctectoid (minimum 0.8 wt % C) is stable. Cast irons can be formulated to have high graphite content, rather than $Fe_3C$ by small silicon and BN (hexagonal) addition. Silicon favors graphite formation in iron over $Fe_3C$ formation, and hexagonal plate BN can serve as a nucleation site "seeds" for hexagonal graphite formation to reduce cementite content in cast irons.

In the processing, iron supersaturated with carbon is "seeded" with small, short nanotube segments, and that these short seed-segments are "grown" in the steel to longer length in the relative absence of competing graphitic "seeds". In support of this process, note that carbon nanotubes have been reported in an ancient "Damascus Steel" sword made by a process which has not yet been fully duplicated by modern metallurgy.

Same-type carbon nanotubes can be grown from cut nanotube segment "seeds" in a vapor-deposition process and carbon nanotubes can be "cloned" by growth without catalyst at their open ends. Iron and nickel (and some others) are catalysts for CNT growth and support wide diffusion of carbon in steel matrices.

Boron nitride (BN) is more stable in iron than carbon, so BN nanotube "seeds" are more stable in iron at elevated steel working temperatures. BN is even somewhat stable in molten steel, as is MnS and $Al_2O_3$, which can also form nanotubes. MnS, $Al_2O_3$ and similar nanotube seeds can nucleate BN and carbon nanotube growth. In accordance with one embodiment, a high carbon steel is heated to at least 1000° C. to dissolve substantially all the carbon, but not BN, MnS or $Al_2O_3$ nanotube "seeds", and then cooled to precipitate the carbon dissolved in the steel onto the BN nanotube seeds, forming carbon nanotube reinforced steel parts in near-finished form. Short BN nanotube "seeds" are introduced into high carbon steel or casting iron melt saturated with BN, under conditions in which they survive at least partially intact to nucleate nanotube formation upon cooling from the melt M. Terrones et al, "Pure and doped boron nitride nanotubes", MaterialsToday (2007) v10: p30-38.

In accordance with the present methods, the short nanotube "seeds" are not fully dissolved in the steel as it is processed, for example by heating to dissolve graphite or convert $Fe_3C$ to an austenite-carbon solution. One approach is mechanical strain dissolution and careful temperature control so that a slightly supersaturated carbon content is always maintained. Another approach is to use "seeds" which do not dissolve as readily as carbon. Hexagonal BN is well-known as a nucleation site for graphite in steel and high-carbon cast irons. Boron nitride nanotubes have very similar strength and physical properties to those of carbon nanotubes. In fact carbon can "grow" on the ends of boron nitride nanotubes. Boron nitride is more stable than graphites and less soluble in steel, so is more stable in nanotube "seed" form in steel, providing a larger working temperature range than carbon nanotube "seeds". Manganese sulfide and $Al_2O_3$ can act as a "seed" for boron nitride. Both MnS and $Al_2O_3$ can form stable nanotubes, on which BN and/or carbon can grow, or precipitate, in nanotube form. This presents a rich opportunity for control of nucleation sites in high-carbon iron and steel for carbon nanotube formation, rather than graphite or $Fe_3C$ formation via thermal and/or strain processing.

Additive manufacturing processes may also utilize high exothermic build materials other than acetylides described herein. For example, 3-D Laser fabrication may be carried out to manufacture reinforced intermetallic structures. The highly exothermic build materials may be dispersed in aqueous thermosensitive polymer solution dispersions as described herein. High-exothermicity "combustible" Ni3Al component materials are examples of intermetallic materials which are difficult to manufacture by conventional methods. Reactive Ni3Al intermetallic printing, and seeded carbon growth are exemplified by the following procedure: Mix Al4C3 and Ni powders in mole ratio to form Ni3Al+C, <5μ to submicron particle size; Include thoroughly mixed 0.1 to 1 wt % short Carbon nanotubes as seeds. Single wall if inexpensively available. The mixture can be lightly ball milled to reduce self-ignition, to make it more uniform, and possibly fragment the CNTs into shorter seed segments; Compress the mixture (eg, in a high-pressure pill press) to a thin disc or layer, or apply slurry to a heat-conductive nickel, steel or copper substrate, and dry; Laser fuse/melt the mixture while scanning across the compressed or slurried surface from a fast to a slow scan rate to provide varied heat input across the sample. Apply pulses to produce at least 5 GPa shock waves. The lowest laser heat input should be enough to just locally ignite the mixture, and the highest (slowest scan) should be enough to melt the Ni3Al. The layer should be thin enough that its heat radiation and conduction to the substrate limits self-propagation. The mixture can be "thermally diluted" for this purpose with Ni3Al or Fe; Laser-fuse-melt under vacuum if possible, or with argon or other inert gas. Can the stage be pre-heated, to say 200 C, to slow cooling to provide more time for growth on seeds; Repeat. Apply mixed powder to laser-melted product surface, and again laser-melt to apply 3-D welding buildup.

As variations, depending on how quickly the melted/fused Ni3Al is cooled, the reaction product could be reheated to a carbon-diffusion temperature of 700-1300 C for a few minutes to enhance CNT, graphene and/or sp3 carbon growth. Alternatively, use single layer graphene seeds. Or, mix Ni3C+Al, or Al4C3+Ni3C+CNTs, nanodiamond (has some graphite) or submicron diamond (no graphite). Or, compress the seeded mixture in the holes of an aluminum or copper microgrid, to limit the self-propagation for purposes of making a quick sample without thermal optimization tests. (eg, Dexmet brand expanded metal grids).

Intermetallic alloys such as NiAl, Ni3Al, FeAl, Fe3Al, TiAl, Ti3Al alloys have strength and high temperature properties but are brittle and difficult to process into finished form. Ni—Al intermetallics have somewhat improved ductility when alloyed with B, hafnium, and other refractory components. Nickel aluminides (eg, Ni3Al) are examples of high-temperature intermetallics with high yield strength which can actually increase with temperature. Ni3Al based compositions listed in the Pawel Jozwik reference cited above which can be formed from high-enthalpy "combustible" reaction components plus "seeds" are well-known in the art.

In addition to testing CNT and other seeded growth, high enthalpy reactions may be used to facilitate 3-D nano fabrication of intermetallics, which melt at high temperatures and are otherwise difficult to manufacture. For example, nickel, iron, titanium etc. powder can be "rolled" into aluminum sheet or foil, or subsequently a fiber, and the sheet or fiber selectively pulse-melted in a 3-D additive manufacturing construction pattern onto a substrate. The reaction heat generated can facilitate local bonding to the substrate structure. The completed structure can be made net-shape, or near shape and/or machined. Al2O3 reaction products can be embedded as reinforcing nanoparticles. Note that Zr, B, and the like can form strong, hard carbide reinforcement upon exothermic reaction of build material reactant mixtures. Ni3Al based alloys can serve as a matrix for TiC, ZrO2, WC, SiC and graphene. Although difficult, laser spot welding and other joining of Ni3Al foils has been employed, but added reaction enthalpy can assist the bonding.

Intermetallic compounds have high strength-to-weight ratios, high temperature creep-rupture strength, resistance to oxidation, and high modulus. $Ti_3Al$ and TiAl intermetallic compounds are said to be ideal for gas-turbine engines, aircraft components and automotive exhaust valves, because of their low density, high strength-to-weight ratio, and high-temperature properties. Intermetallic silicides such as $Ti_5Si_3$ have promising high-temperature structural properties including low-temperature toughness, high temperature strength and creep resistance, oxidation resistance and relatively low density. Intermetallic matrix composites with refractory reinforcements such as alumina $Al_2O_3$ and/or TiC, can substantially enhance high-temperature properties of intermetallic alloys. For example, alumina-reinforced titanium aluminides, and titanium carbide-reinforced $Ni_3Al$ composites have excellent high temperature properties, and intermetallic-matrix composites based on $Ti_5Si_3$ are attractive alternatives to carbon/carbon and ceramic/ceramic composites at temperatures up to 1600° C. TiC—TiB2-Al2O3 composites have been made by solid state combustion of powdered TiO2, Aluminum, $B_2O_3$ and Carbon, to form a porous reaction product which can be sintered at 1800° C. to very high hardness (18.7 Gpa) and reasonable flexural strength (400 MPa).

However, such intermetallic compounds and particularly their reinforced composites, are difficult to cast in final form. There are a number of significant problems associated with the manufacture of high performance intermetallic compounds such as titanium and nickel aluminides, silicides and borides, and forming them into dense, useful products. Intermetallics typically require high working temperatures, and have relatively low ductility, poor hot workability, and poor machinability. These problems are exacerbated for intermetallic composites containing hard, refractory reinforcements. Such materials are commonly made by "solid state combustion" techniques, and are formed into useful products by expensive, time-consuming powder metallurgical techniques at high working temperatures and pressures. A 3-D laser scanning, combustion reaction manufacture to form solid products can enable manufacture of products from such difficult materials. A range of intermetallic, refractory compounds is conventionally made by "Solid State Combustion", or "Self-Propagating High-Temperature Synthesis" (SHS), by utilizing the heat released by exothermic reactions in the formation of these materials. The reactant mixtures are normally in the form of compressed powders of exothermic reactants which are subsequently ignited, either locally at one point (propagating mode) or by heating the whole pellet to the ignition temperature of the exothermic reaction (simultaneous combustion mode). W. C. Lee et al, "Combustion Syntheses of Ti—Al Intermetallic Materials", International Journal Of Self-Propagating High-Temperature Synthesis, Vol. 4, p. 98 (1995). Solid-state combustion has also been used to fabricate a variety of intermetallic reinforced composites, which can have submicron reinforcement size, and a high volume fraction of refractory reinforcement, but also significant porosity. In accordance with the present disclosure, such reactants may be mixed in an aqueous dispersion in a thermosensitive polymer solution, which may further include other materials, and applied to substrates as build materials at temperatures above the LCST of the dispersion. Upon dewatering and drying, the materials may be reacted in place by laser energy.

Figure 12:
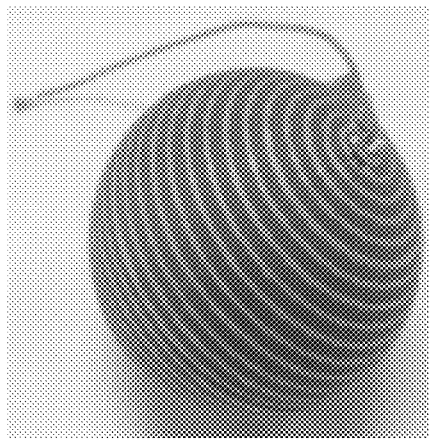
FIG. 12 is an image of a conventional additive-manufactured rf antenna device with poor conductivity and efficiency.
Figure 13:
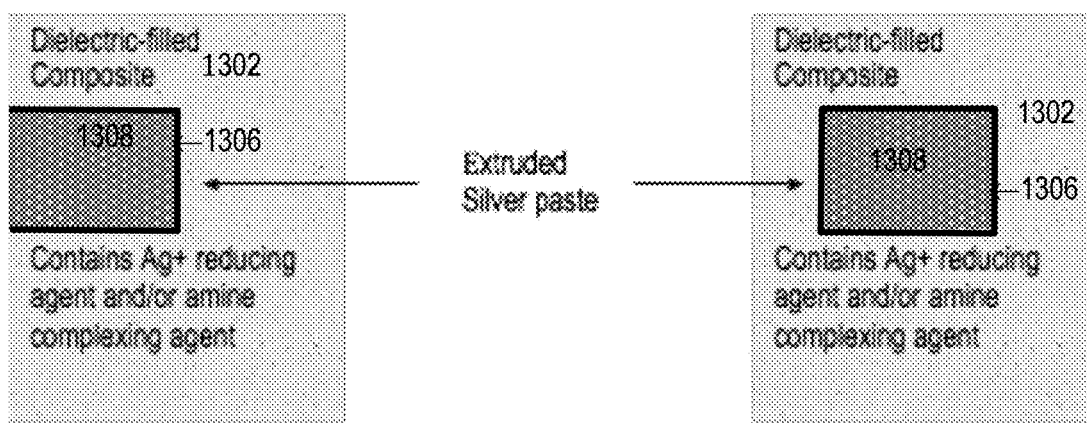
FIG. 13 is a schematic cross-sectional illustration of improved conductivity additive manufacture for rf devices.

There is a need for increased electrical conductivity of conductive inks in additive manufacture for antennas, rf connectors and other radio frequency devices. For example, FIG. 12 is an illustration of a US Army 185 MHz RF antenna made by 3D additive extrusion of an inorganic dielectric loaded organic polymer and a conventional silver nanoparticle ink, using an nScript brand filament extrusion printer. The antenna electrode is unfortunately an order of magnitude less conductive than bulk copper (which itself is less conductive than bulk silver), leading to ohmic losses and radiation inefficiency. However, as illustrated by FIG. 13, by using a high-concentration silver nanoparticle extrusion composition 1302 which contains some silver oxide, silver halide, diaminesilver(I) acetate and/or silver nitrate, the formed RF structure may be sprayed or dipped in a reducing agent (eg, aldehyde) and/or ammonia solution or subjected to a reducing atmosphere to deposit metallic silver in situ to connect the conducting silver particles, flakes, fibers etc in the silver ink. A reducing agent may also be included in or comprise the plastic-dielectric composite material, which can reduce the adjacent silver compounds in the extruded antenna conductor and deposit metallic silver in the adjacent RF structure to connect the silver particles. In this regard, the non-conducting dielectric filled, additive manufactured composite 1304 may contain an organic or inorganic reducing agent, which will reduce the silver salt component of the extruded silver particle ink 1302. Preferably, the silver salt-containing ink extrudate may be co-extruded with a thin wholly or partially surrounding polymer 1306 containing or comprising a reducing agent. Examples of such reducing coexudates include chemically and/or electrochemically reduced forms of redox polymers such as polyimide precursors such as BTDA/4,4'-ODA, polyanilines, of poly(vinylpyrrolidone), polyurethanes, biphenyldiols, imides, imines and the like may comprise, or be mixed in particle or cosolvency form in a thin coextrusion layer. Similarly, an inorganic, reducing dielectric material may be included in the enveloping coextruded layer of additive-build thermoplastic around the metal nanoparticle electrode or antenna.

There has been significant effort to develop curved imagers for improved camera systems. Flat monocrystalline silicon and other semiconductor imagers can be carefully forced into a curved shape which is optically more efficient and simpler for imaging. Vacuum, edge-compressive and pneumatic force have been used to minimize tensile strain. But despite the optical and camera advantages, these technologies are not fully adequate for optimal commercial practice. There is a need for further improvement for commercial automated manufacture of curved imager chip systems. In accordance with the present disclosure, a curved chip carrier base having normally concave surface is strained to approximate flatness, a flat imager is bonded in the plane of its focal imaging plane to the flattened but normally-concave carrier base surface, and then the stress on the chip carrier is removed to restore the normally concave shape of the chip carrier base surface bonded to the imager, forcing the imager to form a concave curved image plane while strongly bonded to the carrier and supported against "wrinkle-ing" on its entire undersurface. This may be a wafer-scale operation. An epoxy or solder bond can readily accommodate a 3-16 or more atmosphere pressure range to deform the imager chips.

Illustrated in FIG. 14 is a schematic process flow diagram of an example of apparatus 1402 and process for curving the flat imaging focal plane of a semiconductor imager 1404 into a concave configuration. As shown in FIG. 14, a base mold 1406 which normally (in the absence of applied stress) has a radially symmetrical concave upper surface 1408 is forced to strained flatness by hydraulic or otherwise powered piston 1410 applied at its lower surface 1412 against a counterforce support 1414 applied at the periphery of the concave surface zone 1408. The force applied by the stressing means 1410 is designed to flatten the normally concave surface 1408. A planar semiconductor imager 1404 such as a CMOS Camera chip or a CCD imager chip having a planar image focal plane is bonded to the flattened surface in a suitable manner such as by epoxy cement 1416 or soldering. It is not necessary that the flattened surface 1408 be completely flat, as gaps between the imager and surface 1408 can be filled with epoxy or other strong adhesive 1416 or solder.

For general VIS backside imager applications, the strainable carrier base 1406 can even be transparent, and serve as a coverglass for reverse-configured applications, saving cost. A glue bond can exert modest compression at the corners of the imager chip upon bonded carrier stress release. This approach is also amenable to the astronomical practice of abutting multiple imagers to increase size and pixel count.

The carrier stress-relief curvature process may apply and stabilize more strain than is possible with a flexible membrane or vacuum deforming process alone. After applying and bonding an imager surface to a strained carrier surface, the strained imager is stabilized along its entire surface against localized "wrinke-ling" and other failure modes to a greater extent than by a vacuum or flexible membrane alone. An additional stabilizing layer may also be applied on the other "membrane side" of the imager chip to complement its attachment to the concave chip carrier. This stabilizing layer (on the image-sensing surface) may be an optical epoxy alone, or as part of the (eg, cell phone) lens assembly.

Figure 15:
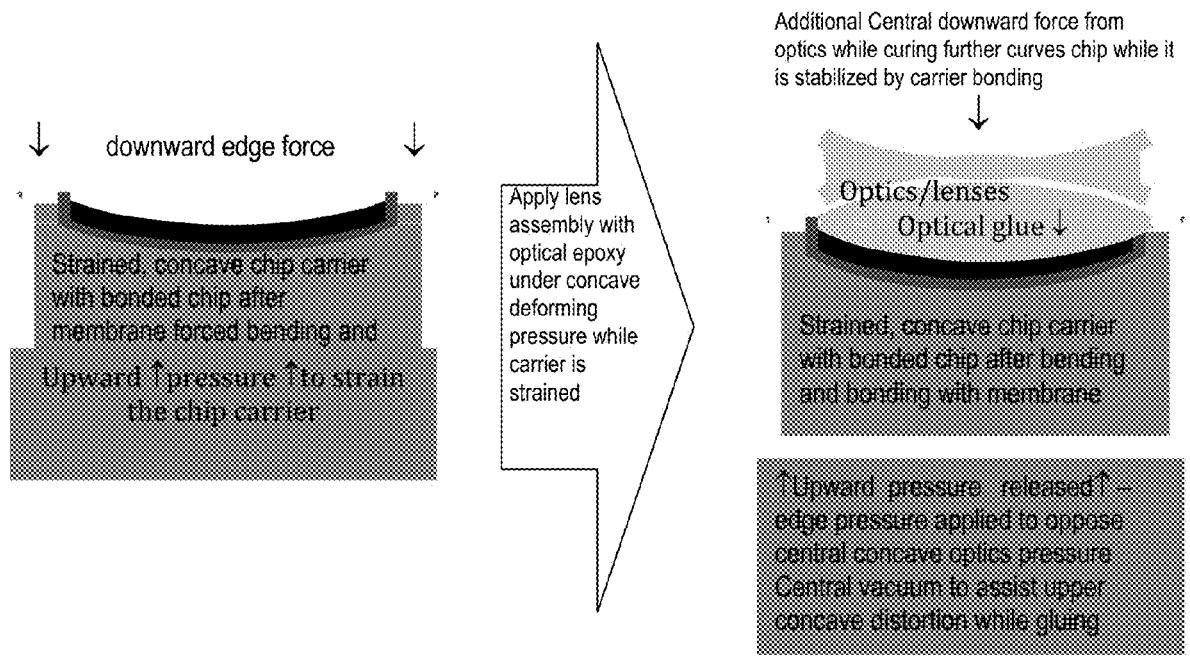
FIG. 15 is a schematic process illustration of applying a lens as a strain inducing element to curve an imager, and cementing the lens to the curved imager.

Application of additional strain and curvature may be imposed on the imager chip with additional stabilization. For example, as illustrated in FIG. 15, curvature force may be applied by a convex lens assembly pressed into the concave imaging element, here after release of the carrier base stress, to further strain the imager. The pressed-in lens can be affixed with an optical epoxy. A transparent flexible membrane (which can become part of the assembled concave curved imager and lens assembly) may be used to protect the imaging surface from mechanical damage during compression. The opposite-side base can be subjected to vacuum or other convex-deforming pulling force to assist the further concave curvature of the imager surface while the optical epoxy is curing to stabilize the assembly.

Additionally, different thermal expansion properties can be exploited to control the tensile/compressive strain at the carrier-imager interface, to further apply the Sony approach. The degree of curvature can also be larger at the edges where optical lens distortion is more difficult to compensate, as proposed by Canon patent disclosure incorporated herein.

As an example, a stock commercial CMOS digital camera chip die is curved in a process like that illustrated in FIG. 14. The digital camera imager die 1404 is a back side imaging (BSI) 18 megapixel CMOS sensor (Aptina brand AR1820HS) with a 1.25 µm pixel pitch, having overall width and length of 7.6×7.7 mm, with a central light sensitive pixel imaging zone of 6.1×4.6 mm. The CMOS silicon substrate is thinned to 16 µm, providing a total die thickness of 25 µm and a length to thickness aspect ratio along the diagonal of about 480:1 which facilitates flexure (as compared to a thicker unthinned imager). The outwardly-facing sensor portion of the backside CMOS chip is forced into generally spherical concave curvatures having radii of at least about 10 mm, and preferably exceeding 25 mm, or subtended spherical angles of at least about 10° and preferably at least about 25° along the diagonal. The imager die 1404 may be bonded to the base mold 1406 upper flatten-strained surface 1408 using a conventional epoxy adhesive cured at a temperature of 100° C. for 30 minutes, or a conventional solder for a solderable metal base. After the epoxy adhesive is cured, the base mold and the bonded, curved CMOS imager chip are cooled and the pressure deforming the base mold is released. This permits the base mold to forcefully return toward its normal, concave configuration at its surface adjacent the CMOS Imager chip bonded thereto, which forces the imager chip into a concave shape conforming to the concave surface of the base mold. The restorative force of the normally concave base mold is higher than the force applicable to curve the CMOS imager, preferably at least 150 percent higher, and more preferably 3 times higher. Accordingly, upon release of the force straining the base mold into flatness at its upper surface bonded to the CMOS imager, the bonded components comprise a free standing, curved imager chip in its curved high strain condition, bonded to its curved base mold in a stress-relieved, low-strain concave upper surface condition. The concave CMOS imager chip and its bonded concave base mold may be mounted and wirebonded to a ceramic leadless chip carrier (LCC) or other package in a conventional manner, such as by manual ball bonding machine. As indicated, the imager chip may be bonded to the base mold using a thin layer of epoxy adhesive cured at an elevated temperature. The base mold may have an expansion coefficient (coefficient of thermal expansion, CTE) greater than that of the imager chip, which can compensate for tensile strain imposed on the chip when the stress is released from the base mold to form a concave surface adjacent the imager chip. For example, single crystal silicon has a CTE of about 2.5, while stainless steel SUS410 has a CTE of about 10.4, stainless steel SUS304 has a CTE of about 17.3, aluminum has a CTE of about 23, copper about 16, titanium about 8.5, polyimides about 20. When bonded to the imager chip at an elevated temperature such as 150 degrees C., and then cooled, the base mold shrinks more than the imager chip, applying compressive strain on the bonded imager chip. When the stress forcing the normally-concave upper surface of the base mold is released, the imager chip undergoes tensile strain upon being forced into a concave configuration, which can be compensated by the larger base mold thermal shrinkage. The base mold material desirably has more deformation flexibility than the imager chip and high proof resilience, which is the ability to store energy when it is deformed elastically, and release that deformation energy as force upon unloading without undergoing permanent distortion. The modulus of resilience is the maximum energy that can be absorbed per unit volume without creating a permanent distortion. Useful base mold materials are thin spring steel, phosphor bronze, titanium, beryllium copper, conventional aluminum and stainless steel curved base molds, and plastic base mold materials such as filled epoxy with greater deformability and proof resilience and restoration force than the imager to be curved into a concave shape.

The approach can also be applied to convex curvature, which may be utilized for backside imagers which can be centrally thinned to <20 microns. In this case, a vacuum may be applied to the backside of a normally convex carrier surface of an optically clear (eg, optical plastic) carrier to flatten it, a backside imager chip is applied with the imaging surface against the carrier surface and bonded to it with an optically clear adhesive, and the chip strain released after bonding. The imager chip is then distorted into a convex shape, with its imaging surface facing and optically glued to the convex surface of the transparent base. Further curvature may be imposed through the optically clear carrier by an optics assembly pressed and then bonded to the reverse (now concave) side of the carrier which faces the imager pixels. The carrier may have a relatively soft surface to protect the pixel surface, while having an overall adequate Young's modulus and resilience to force imager curvature.

The invention claimed is:
1. A method for additive 3D manufacturing of a designed object based on a 3D digital data model of said object characterized in shape and structure by a plurality of adjacent object layers of build material, by sequential application of a plurality of geometrically designed object layer patterns of build material characterizing the shape and structure of said object, comprising the steps of
providing an aqueous dispersion of an object build material dispersed in an aqueous solution of a thermosensitive polymer in water to form an aqueous amphiphilic dispersion which undergoes phase separation from the water component of said aqueous dispersion upon heating to a phase change temperature at which said thermosensitive polymer precipitates from aqueous solution together with said build material above the lower critical solution temperature, LCST, of said aqueous amphiphilic dispersion, selectively extruding said aqueous amphiphilic dispersion at a temperature below its LCST precipitation phase change temperature onto a suitable substrate corresponding to a geometrically defined pattern of the first of said object layers, heating said extruded aqueous dispersion above its LCST to congeal and aggregate said build material of said extruded aqueous dispersion together with said thermosensitive polymer while separating and expelling liquid water to deposit the build material in the first of said object layer patterns, said heating being carried out by application of thermal energy to the extruded amphiphilic dispersion by directed laser light, subsequently repeating said extrusion and heating steps to form each of said adjacent layers of build material on the preceding object layer as a substrate, to form the shape and structure of said object.

2. The method of claim 1 wherein said congealed and aggregated build material of said extruded aqueous dispersion does not re-emulsify or re-disperse when the temperature of the formed object is cooled below the LCST.

3. The method of claim 1 wherein the substrate is maintained at a temperature higher than the LCST of the applied aqueous suspension.

4. The method of claim 1 wherein said aqueous amphiphilic dispersion comprises a conductive or semiconductive material for fabricating conductor or semiconductor patterns, devices, electrodes, capacitors and other electronic components.

5. The method of claim 1 wherein said aqueous amphiphilic dispersion comprises silver or copper acetylides or —C≡C—CH3 precipitates deposited on silicon nanoparticles for manufacture of lithium battery electrodes by 3D printing.

6. The method of claim 1 wherein said aqueous amphiphilic dispersion comprises from about 10 wt % to about 85 wt % water, from about 1 wt % to about 15 wt % of an amphiphilic thermosensitive polymer, and from about 5 wt % to about 80 wt % of a build material based on the total weight of said aqueous amphiphilic dispersion, and wherein said build material has an average particle size in the range of from about 0.1 micron to about 500 microns.

7. The method of claim 1 wherein said build material comprises low alloy high carbon ferrous metal powder for metal product manufacture, and wherein said aqueous amphiphilic dispersion further comprises short hBN nanotube, short carbon nanotube, and/or cBN seeds having an individual particle volume of less than about 3 million cubic nanometers and wherein the carbon nanotube or hBN nanotube seeds have a length less than about 1000 microns, and wherein the average distance between said seed particles in said congealed and aggregated build material is less than 50 microns.

8. The method of claim 7 wherein said aqueous amphiphilic dispersion comprises Fe or Ni or acetylide coated particles as internal-heat generating particles.

9. The method of claim 7 wherein said congealed and aggregated layer of said build material is dried to form a metal particle layer from about 5 to about 200 μm thick, wherein said dried metal particle layer is scanned by laser at high temperature to melt through and re-solidify one or more previously-deposited layers, and wherein carbon is grown onto said seeds at temperatures in the range of 700° C. to 900° C.

10. The method of claim 1 wherein said formed and structured object is dried and sintered.

* * * * *